(12) United States Patent
Tabata et al.

(10) Patent No.: US 12,230,078 B2
(45) Date of Patent: Feb. 18, 2025

(54) SOUND-SOURCE SEARCH SYSTEM AND SOUND-SOURCE SEARCH METHOD

(71) Applicant: TOYOTA JIDOSHA KABUSHIKI KAISHA, Toyota (JP)

(72) Inventors: Atsushi Tabata, Okazaki (JP); Masafumi Yamamoto, Nagakute (JP); Koichi Okuda, Toyota (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/517,411

(22) Filed: Nov. 2, 2021

(65) Prior Publication Data
US 2022/0198845 A1 Jun. 23, 2022

(30) Foreign Application Priority Data
Dec. 17, 2020 (JP) ................................. 2020-209728

(51) Int. Cl.
*B60W 40/10* (2012.01)
*G07C 5/08* (2006.01)

(52) U.S. Cl.
CPC .......... *G07C 5/0833* (2013.01); *B60W 40/10* (2013.01); *B60W 2420/54* (2013.01); *B60W 2554/4041* (2020.02)

(58) Field of Classification Search
None
See application file for complete search history.

(56) References Cited

U.S. PATENT DOCUMENTS

| | | | | |
|---|---|---|---|---|
| 4,853,879 A | * | 8/1989 | Matzoll, Jr. | ........ G01N 21/9515 356/73 |
| 2013/0147835 A1 | * | 6/2013 | Lee | ........................ H04R 3/005 381/92 |
| 2015/0305718 A1 | * | 10/2015 | Ogasawara | ............ A61B 8/466 600/440 |
| 2018/0348767 A1 | * | 12/2018 | Jafari Tafti | ............ G08G 1/166 |

(Continued)

FOREIGN PATENT DOCUMENTS

| | | |
|---|---|---|
| CN | 103674232 A | 3/2014 |
| JP | 2010-091282 A | 4/2010 |
| JP | 2020-098118 A | 6/2020 |

*Primary Examiner* — Jason Holloway
(74) *Attorney, Agent, or Firm* — Oliff PLC

(57) ABSTRACT

A sound-source search system for searching a sound source that causes a noise propagated inside or outside a cabin of a vehicle. The system includes: a sound-source search device for acquiring sound data by collecting and measuring a sound; an informing device for informing a sound measuring position in which the sound-source search device should be installed for collecting and measuring the sound; and a control device for acquiring a driving information related to a driving state of the vehicle upon generation of the noise. The control device extracts a sound-source candidate that is a candidate of the sound source causing the noise, based on the acquired driving information, and to cause the informing device to inform the sound measuring position that is set based on a predetermined relationship between the sound-source candidate and the sound measuring position. Also disclosed is a sound-source search method using the sound-source search device.

10 Claims, 17 Drawing Sheets

| SOUND-SOURCE CANDIDATE | FIRST MEASURING POSITION | SECOND MEASURING POSITION |
|---|---|---|
| TRANSMISSION GEAR NOISE (GEAR NOISE) | CENTER CONSOLE | SHIFT LEVER |
| TRANSMISSION OIL PUMP (PUMP NOISE) | SHIFT LEVER | DRIVER'S SEAT SIDE WINDOW |
| ENGINE PART A | BLOW-OUT HOLE IN DRIVER SEAT | POSITION DISTANT FROM FIRST MEASURING POSITION BY PREDETERMINED DISTANCE |
| ENGINE PART B | BLOW-OUT HOLE IN CENTER | BLOW-OUT HOLE IN DRIVER SEAT |
| MG2 NOISE | CENTER CONSOLE | POSITION DISTANT FROM FIRST MEASURING POSITION BY PREDETERMINED DISTANCE |
| RATTLE NOISE | BLOW-OUT HOLE IN CENTER | POSITION DISTANT FROM FIRST MEASURING POSITION BY PREDETERMINED DISTANCE |
| CAVITATION NOISE | SHIFT LEVER | POSITION DISTANT FROM FIRST MEASURING POSITION BY PREDETERMINED DISTANCE |
| METER PART C | BLOW-OUT HOLE IN CENTER | GLOVEBOX |
| AIR CONDITIONER | LEFT SIDE OF REAR SEAT | POSITION DISTANT FROM FIRST MEASURING POSITION BY PREDETERMINED DISTANCE |
| ... | ... | ... |

(56) References Cited

U.S. PATENT DOCUMENTS

| | | | |
|---|---|---|---|
| 2020/0039531 A1* | 2/2020 | Fushimi | G01S 17/86 |
| 2020/0086394 A1* | 3/2020 | Park | B23Q 15/22 |
| 2020/0275224 A1* | 8/2020 | Nakadai | H04R 29/005 |
| 2021/0327174 A1* | 10/2021 | Lee | G07C 5/0833 |
| 2021/0366210 A1* | 11/2021 | Okuda | G07C 5/006 |
| 2022/0124448 A1* | 4/2022 | Barreiro | A63F 13/25 |
| 2022/0194383 A1* | 6/2022 | Tabata | B60W 40/02 |
| 2022/0329936 A1* | 10/2022 | Kobayashi | B60W 40/04 |
| 2022/0383675 A1* | 12/2022 | Tabata | B60W 50/12 |
| 2023/0074274 A1* | 3/2023 | Kim | B60W 50/14 |

* cited by examiner

FIG.7

| SOUND-SOURCE CANDIDATE | FIRST MEASURING POSITION | SECOND MEASURING POSITION |
|---|---|---|
| TRANSMISSION GEAR NOISE (GEAR NOISE) | CENTER CONSOLE | SHIFT LEVER |
| TRANSMISSION OIL PUMP (PUMP NOISE) | SHIFT LEVER | DRIVER'S SEAT SIDE WINDOW |
| ENGINE PART A | BLOW-OUT HOLE IN DRIVER SEAT | POSITION DISTANT FROM FIRST MEASURING POSITION BY PREDETERMINED DISTANCE |
| ENGINE PART B | BLOW-OUT HOLE IN CENTER | BLOW-OUT HOLE IN DRIVER SEAT |
| MG2 NOISE | CENTER CONSOLE | POSITION DISTANT FROM FIRST MEASURING POSITION BY PREDETERMINED DISTANCE |
| RATTLE NOISE | BLOW-OUT HOLE IN CENTER | POSITION DISTANT FROM FIRST MEASURING POSITION BY PREDETERMINED DISTANCE |
| CAVITATION NOISE | SHIFT LEVER | POSITION DISTANT FROM FIRST MEASURING POSITION BY PREDETERMINED DISTANCE |
| METER PART C | BLOW-OUT HOLE IN CENTER | GLOVEBOX |
| AIR CONDITIONER | LEFT SIDE OF REAR SEAT | POSITION DISTANT FROM FIRST MEASURING POSITION BY PREDETERMINED DISTANCE |
| ... | ... | ... |

SOUND-SOURCE SEARCH SYSTEM AND SOUND-SOURCE SEARCH METHOD

This application claims priority from Japanese Patent Application No. 2020-209728 filed on Dec. 17, 2020, the disclosure of which is herein incorporated by reference in its entirety.

FIELD OF THE INVENTION

The present invention relates to a sound-source search system and a sound-source search method for searching a sound source that causes a noise propagated inside or outside a cabin of a vehicle.

BACKGROUND OF THE INVENTION

In JP2010-91282A, there is proposed a sound-source search device configured to detect a location of generation of a noise propagated inside a cabin of a vehicle. In the sound-source search device disclosed in this Japanese Patent Application Publication, a sound data is generated by collecting the noise, and the sound data is analyzed whereby the location of generation of the noise is specified.

SUMMARY OF THE INVENTION

By the way, the sound-source search device disclosed in the above-identified Japanese Patent Application Publication is configured to specify the location within the vehicle cabin from which the noise is propagated. Where the sound source causing the noise is to be specified by using the sound-source search device, as disclosed in the above-identified Japanese Patent Application Publication, an accuracy of specifying the sound source by the sound-source search device is reduced with increase of a distance of the sound-source search device from a propagation path of the noise, so that specifying the sound source is difficult when the distance is large. Therefore, it is necessary to appropriately determine a position in which the sound-source search device is to be installed. However, since the noise could be caused by various factors, it is difficult to appropriately determine the position in which the sound-source search device should be installed, thereby problematically increasing burden to an inspector who performs a sound-source searching operation.

The present invention was made in view of the background art described above. It is therefore an object of the present invention to provide a sound-source search system and a sound-source search method, which make it possible to perform a sound-source searching operation for searching a sound source that causes a noise propagated inside or outside a cabin of a vehicle, with an increased accuracy and with a reduced burden.

The object indicated above is achieved according to the following aspects of the present invention.

According to a first aspect of the invention, there is provided a sound-source search system for searching a sound source that causes a noise propagated inside or outside a cabin of a vehicle, the sound-source search system comprising: (a) a sound-source search device configured to acquire sound data by collecting and measuring a sound; (b) an informing device configured to inform a sound measuring position in which the sound-source search device is to be installed for collecting and measuring the sound; and (c) a control device configured to acquire a driving information related to a driving state of the vehicle upon generation of the noise, wherein the control device is configured to extract a sound-source candidate that is a candidate of the sound source causing the noise, based on the acquired driving information, and to cause the informing device to inform the sound measuring position which is dependent on the extracted sound-source candidate and which is set based on a predetermined relationship between the sound-source candidate and the sound measuring position.

According to a second aspect of the invention, in the sound-source search system according to the first aspect of the invention, the control device is configured, when the sound-source search device is installed, to acquire an amount of deviation of an installed position in which the sound-source search device is installed, from the sound measuring position, wherein the control device is configured, when the amount of the deviation exceeds an allowable value, to cause the informing device to inform the amount of the deviation as a correction amount by which the installed position of the sound-source search device is to be corrected.

According to a third aspect of the invention, in the sound-source search system according to the first or second aspect of the invention, the control device is configured to set, as the sound measuring position, a first measuring position and a second measuring position, wherein the control device is configured to presume whether the sound-source candidate is the sound source or not, based on (i) the sound data acquired when the sound is collected and measured by the sound-source search device in a state in which the sound-source search device is installed in the first measuring position and (ii) the sound data acquired when the sound is collected and measured by the sound-source search device in a state in which the sound-source search device is installed in the second measuring position.

According to a fourth aspect of the invention, there is provided a sound-source search method of searching a sound source that causes a noise propagated inside or outside a cabin of a vehicle, by using a sound-source search device configured to acquire sound data by collecting and measuring the noise, the sound-source search method comprising: (a) causing a control device to acquire a driving information related to a driving state of the vehicle upon generation of the noise, and to extract a sound-source candidate based on the acquired driving information; (b) causing an informing device to inform a sound measuring position in which the sound-source search device is to be installed for collecting and measuring the noise, wherein the sound measuring position is dependent on the extracted sound-source candidate and is set based on a predetermined relationship between the sound-source candidate and the sound measuring position; and (c) causing the sound-source search device to acquire the sound data.

In the sound-source search system according to the first aspect of the invention, the control device extracts the sound-source candidate, based on the driving information related to the driving state upon generation of the noise, and causes the informing device to inform the sound measuring position which is dependent on the extracted sound-source candidate and which is set based on the predetermined relationship between the sound-source candidate and the sound measuring position, so that it is possible to install the sound-source search device in the sound measuring position that is appropriate for presuming the sound source that causes the noise, thereby improving the accuracy of presuming the sound source. Further, since the sound measuring position of the sound-source search device is easily determined or set, it is possible to reduce the burden in the sound-source searching operation.

In the sound-source search system according to the second aspect of the invention, when the sound-source search device is installed in the sound measuring position, it is determined whether the sound-source search device is correctly installed in the sound measuring position or not. When the amount of deviation of the installed position of the sound-source search device from the sound measuring position exceeds the allowable value, the correction amount by which the installed position of the sound-source search device is to be corrected is informed by the informing device to the inspector, so that the inspector can easily and correctly install in the sound measuring position, by correcting the installed position of the sound-source search device by the correction amount informed by the informing device. Further, since the noise is measured with the sound-source search device being correctly installed in the sound measuring position, the accuracy of presuming the sound source is improved.

In the sound-source search system according to the third aspect of the invention, it is presumed whether the sound-source candidate is the sound source or not, based on (i) the sound data acquired when the sound is collected and measured by the sound-source search device in the state in which the sound-source search device is installed in the first measuring position and (ii) the sound data acquired when the sound is collected and measured by the sound-source search device in the state in which the sound-source search device is installed in the second measuring position, so that it is possible to further increase the accuracy of presuming whether the sound-source candidate is the sound source or not.

In the sound-source search method according to the fourth aspect of the invention, the control device extracts the sound-source candidate, based on the driving information related to the driving state upon generation of the noise, and causes the informing device to inform the sound measuring position which is dependent on the extracted sound-source candidate and which is set based on the predetermined relationship between the sound-source candidate and the sound measuring position. Owing to the method, it is possible to install the sound-source search device in the sound measuring position that is appropriate for presuming the sound source that causes the noise, thereby improving the accuracy of presuming the sound source. Further, since the sound measuring position of the sound-source search device is easily determined or set, it is possible to reduce the burden in the sound-source searching operation.

BRIEF DESCRIPTION OF THE DRAWINGS

FIG. 7 is a view showing, by way of example, a related map defining a sound measuring position of a search device for each of the sound-source candidates;

DETAILED DESCRIPTION OF PREFERRED EMBODIMENTS

Hereinafter, there will be described preferred embodiments in detail with reference to the accompanying drawings. It is noted that the figures of the drawings are simplified or deformed as needed, and each portion is not necessarily precisely depicted in terms of dimension ratio, shape, etc.

First Embodiment

Figure 1:
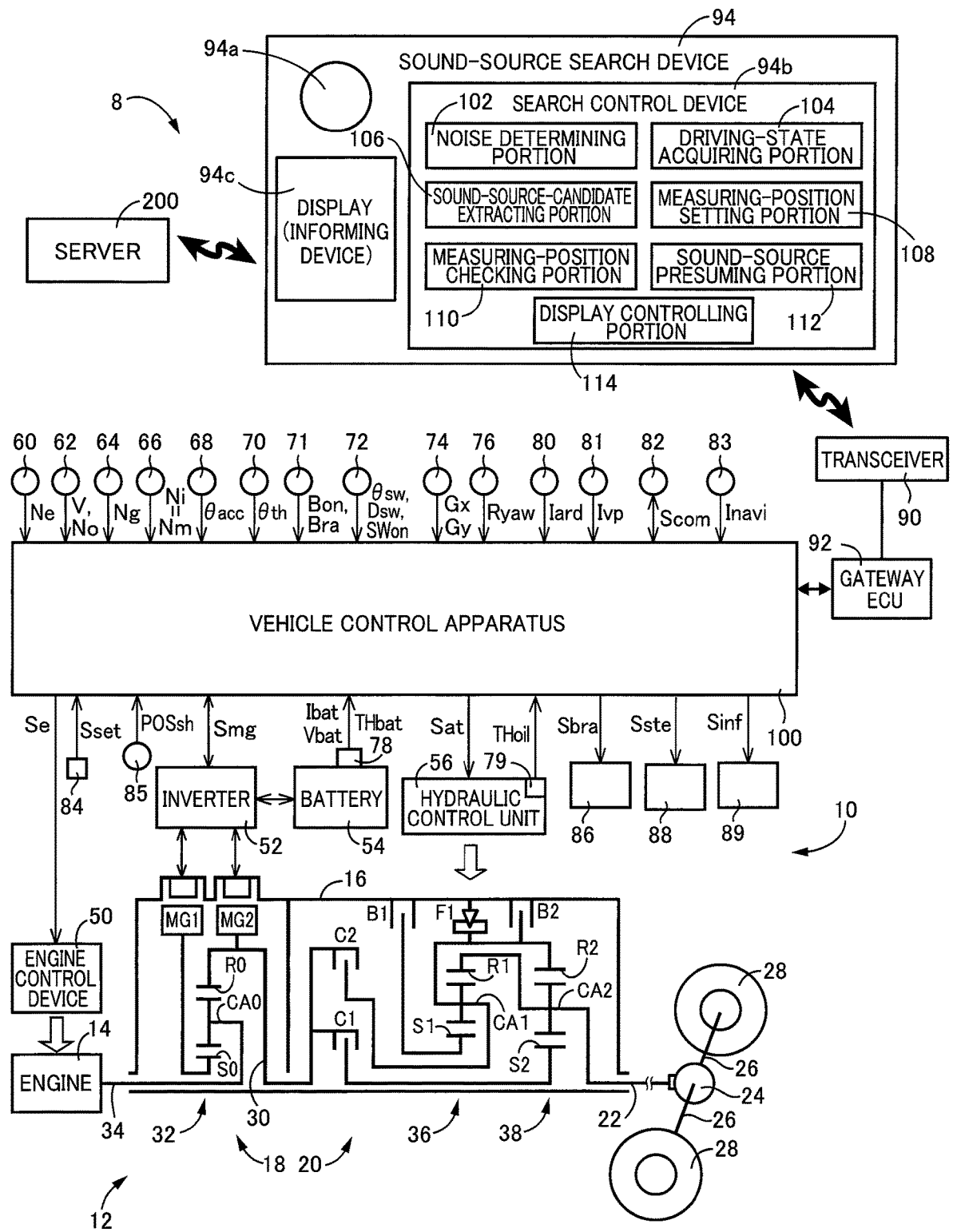
FIG. 1 is a view schematically showing a construction of a vehicle to which the present invention is applied, and also a construction of a sound-source search system for searching a noise-causing sound source that causes a noise propagated inside a cabin of the vehicle.

FIG. 1 is a view schematically showing a construction of a vehicle 10 to which the present invention is applied, and also a construction of a sound-source search system 8 for searching a sound source that causes a noise propagated inside or outside a cabin of the vehicle 10.

The vehicle 10 includes an engine 14, a first rotating machine MG1 and a second rotating machine MG2, and is a hybrid electric vehicle in which the engine 14 and the second rotating machine MG2 serve as drive power sources for driving the vehicle 10. The vehicle 10 further includes a power transmission apparatus 12 that constitutes a drive-power transmission path between the engine 14 and drive wheels 28. The power transmission apparatus 12 includes a casing 16 as a non-rotary member, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The power transmission apparatus 12 further includes a differential gear device 24 connected to an output shaft 22 that is an output rotary member of the step-variable transmission portion 20, and a pair of axles 26 connected to the differential gear device 24.

In the power transmission apparatus 12, the drive power outputted from the engine 14 or the second rotating machine MG2 is transmitted to the step-variable transmission portion 20, and is then transmitted from the step-variable transmission portion 20 to the drive wheels 28 of the vehicle 10, for example, through the differential gear device 24. It is noted that the power corresponds to a torque or a force unless otherwise distinguished from them. It is also noted that the power transmission apparatus 12 including the continuously-variable transmission portion 18 and the step-variable transmission portion 20 is constructed substantially symmetrically about its axis corresponding to the above-described common axis, so that a lower half of the power transmission apparatus 12 is not shown in FIG. 1.

The engine 14 serves as the drive power source capable of generating a drive torque, and is a known internal combustion engine such as gasoline engine and diesel engine. The vehicle 10 is provided with an engine control device 50 that includes a throttle actuator, a fuel injection device and an ignition device. With the engine control device 50 being controlled, an engine torque Te, which is an output torque of the engine 14, is controlled.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by a vehicle control apparatus 100 whereby an MG1 torque Tg and an MG2 torque Tm as output torques of the respective first and second rotating machines MG1, MG2 are controlled.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmitting member 30 that is an output rotary member of the continuously-variable transmission portion 18; and a second rotating machine (second motor/generator) MG2 connected to the intermediate transmitting member 30 in a drive-force transmittable manner. The differential mechanism 32 is constituted by a planetary gear device of a single-pinion type having a sun gear S0, a carrier CA0 and a ring gear R0. The carrier CA0 is connected to the engine 14 through a connecting shaft 34 in a drive-force transmittable manner, and the sun gear S0 is connected to the first rotating machine MG1 in a drive-force transmittable manner, while the ring gear R0 is connected to the second rotating machine MG2 in a drive-force transmittable manner. The continuously-variable transmission portion 18 is an electrically-controlled continuously-variable transmission wherein a differential state of the differential mechanism 32 is controllable by controlling an operation state of the first rotating machine MG1.

The step-variable transmission portion 20 is a mechanically-operated transmission mechanism which constitutes a part of a drive-power transmitting path between the continuously-variable transmission portion 18 and the drive wheels 28. The step-variable transmission portion 20 is a known automatic transmission of a planetary gear type which is provided with a plurality of planetary gear devices in the form of a first planetary gear device 36 and a second planetary gear device 38, and a plurality of engagement devices including a clutch C1, a clutch C2, a brake B1 and a brake B2. Hereinafter, the clutch C1, clutch C2, brake B1 and brake B2 will be referred to as "engagement devices CB" unless otherwise specified. Each of the engagement devices CB receives an engagement hydraulic pressure PRcb that is controlled by a hydraulic control unit 56 provided in the vehicle 10. When a gear position is selected, based on an accelerator operation amount (accelerator opening degree $\theta$acc) and a running speed V of the vehicle 10, for example, so as to be established in the step-variable transmission portion 20, operation states of the respective engagement devices CB are controlled such that corresponding at least one of the engagement devices CB is engaged for establishing the selected gear position.

Referring back to FIG. 1, the vehicle 10 is provided with the vehicle control apparatus 100 as a controller including control devices which are configured to control, for example, the engine 14, continuously-variable transmission portion 18 and step-variable transmission portion 20. For example, the vehicle control apparatus 100 includes a so-called microcomputer incorporating a CPU, a RAM, a ROM and an input-output interface. The CPU performs control operations of the vehicle 10, by processing various input signals, according to control programs stored in the ROM, while utilizing a temporary data storage function of the RAM. The vehicle control apparatus 100 may be constituted by two or more control units exclusively assigned to perform different control operations such as the engine control operation and the shift control operation.

The vehicle control apparatus 100 receives various input signals based on values detected by respective sensors provided in the vehicle 10. Specifically, the vehicle control apparatus 100 receives: an output signal of an engine speed sensor 60 indicative of an engine rotational speed Ne which is a rotational speed of the engine 14; an output signal of an output speed sensor 62 indicative of an output-shaft rotational speed No which is a rotational speed of the output shaft 22 and which corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of an MG2 rotational speed Nm which is a rotational speed of the second rotating machine MG2 and which corresponds to an AT input rotational speed Ni; an output signal of an accelerator-opening degree sensor 68 indicative of an acceleration opening degree $\theta$acc representing an amount of accelerating operation made by the vehicle driver; an output signal of a throttle-opening degree sensor 70 indicative of a throttle opening degree $\theta$th; an output signal of a brake pedal sensor 71 indicative of a brake-ON signal Bon representing a state of depression of a brake pedal by the vehicle driver to operate wheel brakes and also a braking operation amount Bra representing an amount of depression of the brake pedal by the vehicle driver corresponding to a depressing force applied to the brake pedal; an output signal of a steering sensor 72 indicative of a steering angle θsw and a steering direction Dsw of a steering wheel provided in the vehicle 10 and also a steering ON signal SWon representing a state in which the steering wheel is being held by the vehicle driver; an output signal of a G senor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 78 indicative of a battery temperature THba, a charging/discharging electric current Ibat and a voltage Vbat of the battery 54; an output signal of a fluid temperature sensor 79 indicative of a working fluid temperature THoil that is a temperature of a working fluid supplied to a hydraulic actuator of each of the engagement devices CB so as to operate each of the engagement devices CB; an output signal of a vehicle-area information sensor 80 indicative of vehicle area information Iard; an output signal of a vehicle location sensor 81 indicative of location information Ivp; an output signal of an external-network communication antenna 82 indicative of an communication signal Scom; an output signal of a navigation system 83 indicative of navigation information Inavi; output signals of drive-assist setting switches 84 indicative of drive-assist setting signals Sset representing a setting made by the vehicle driver for execution of a drive-assist control such as automatic drive control and a cruise control; and an output signal of a shift position sensor 85 indicative of an operation position POSsh of a shift lever provided in the vehicle 10.

The vehicle control apparatus 100 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; hydraulic control command signal Sat that is to be supplied to the hydraulic control unit 56 for controlling the operation states of the engagement devices CB; the communication signal Scom that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 88, for controlling steering of wheels (especially, front wheels) of the vehicle 10; and an information-notification-control command signal Sinf that is to be supplied to an information notification device 89, for warning and notifying information to the vehicle driver.

The vehicle 10 further includes a transceiver 90 and a gateway ECU 92. The transceiver 90 is a device configured to communicate with a sound-source search device 94 and a server 200, wherein the sound-source search device 94 has a function of searching the sound source (hereinafter referred to as "noise-causing sound source") that causes the noise.

The gateway ECU 92 has substantially the same hardware construction as the vehicle control apparatus 100, and is constituted by, for example, a relay device provided to rewrite programs and/or data stored in the rewritable ROM included in the vehicle control apparatus 100. The gateway ECU 92 is connected to the transceiver 90, and is configured to receive and transmit various information between the vehicle control apparatus 100 and the sound-source search device 94, by using a wireless communication between the transceiver 90 and the sound-source search device 94. Further, the gateway ECU 92 is capable of receiving and transmitting the various information also between the vehicle control apparatus 100 and the server 200, by using a wireless communication between the transceiver 90 and the server 200.

The server 200 is a system present on a network outside the vehicle 10, and is configured to receive, process, analyze, store and supply the various information such as vehicle state information and vehicle phenomenon information, by using a wireless communication between the sound-source search device 94 and the vehicle control apparatus 100. The server 200 transmits and receives the various information to and from the sound-source search device 94 and the vehicle control apparatus 100. The vehicle state information represents, for example, an operation state or driving state related to driving of the vehicle 10, which is detected by the various sensors or the like. This operation state or driving state (hereinafter simply referred to as "driving state") is represented, for example, by the accelerator operation degree θacc and the vehicle running speed V. The vehicle state information is transmitted to the server 200, for example, via the gateway ECU 92 and the sound-source search device 94. The vehicle phenomenon information represents, for example, phenomenons caused in the vehicle 10. These phenomenons are, for example, a sound pressure SP which is detected by a sound-pressure detection portion 94a and which represents a level of a sound inside the vehicle cabin, and also a vibration which is detected by the G sensor 74 and which is felt by the vehicle driver and passengers. It is noted that the vehicle state information may be transmitted to the server 200, via the external-network communication antenna 82 through the wireless communication.

The sound-source search device 94 (hereinafter referred to as "search device 94") is provided with the above-described sound-pressure detection portion 94a that includes a microphone configured to detect the sound pressure SP inside the vehicle cabin; a search control device 94b configured to control operations of the sound-source search system 8 as a whole including the search device 94; and a display 94c configured to indicate an instruction for the inspector during search of the noise-causing sound source. The sound-pressure detection portion 94a functions as a sound collecting device configured to collect the sound inside the vehicle cabin and to acquire the sound pressure SP as sound data. For searching the noise-causing sound source, the search control device 94b has various control functions for searing the noise-causing sound source, wherein the various control functions include a function of supplying an instruction to the inspector, a function of setting a sound measuring position for searching the noise-causing sound source and a function of presuming the noise-causing sound source. The control operations of the search control device 94b will be described later. The display 94c functions as an informing device configured, when the noise-causing sound source is searched, to inform the inspector of various information such as sound-source candidates and a sound measuring position of the search device 94 which is dependent on each of the sound-source candidates, by indicating the sound-source candidates and the sound measuring position. It is noted that the search control device 94b and the display 94c correspond to "control device" and "informing device", respectively, which are recited in the appended claims.

The vehicle control apparatus 100 executes various control operations. For example, the vehicle control apparatus 100 determines a shifting action of the step-variable transmission portion 20, by using, for example, an AT gear position shift map (not shown), which is a prestored relationship obtained by experimentation or determined by an appropriate design theory, and executes the shift control operation in the step-variable transmission portion 20 as needed. The AT gear position shifting map is a predetermined relationship between two variables in the form of the vehicle running speed V and the required drive force Frdem, for example, which relationship is used to determine the shifting action of the step-variable transmission portion 20 and is represented by shifting lines in two-dimensional coordinates in which the running speed V and the required drive force Frdem are taken along respective two axes.

The vehicle control apparatus 100 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The vehicle control apparatus 100 calculates a drive request amount in the form of the required drive force Frdem that is to be applied to the drive wheels 28, by applying the accelerator opening degree θacc and the vehicle running speed V to, for example, a drive request amount map that is a predetermined relationship. As the drive request amount, a required drive torque Trdem [Nm] applied to the drive wheels 28, a required drive power Prdem [W] applied to the drive wheels 28 and a required AT output torque applied to the output shaft 22 can be used as well as the required drive force Frdem [N].

For example, when the continuously-variable transmission portion 18 is operated as a continuously variable transmission, the vehicle control apparatus 100 controls the engine 14 and controls a generated electric power Wg of the first rotating machine MG1 so as to attain the engine rotational speed Ne and the engine torque Te at which an engine power Pe achieving the required drive power Prdem is acquired in consideration of an engine optimum fuel consumption point etc., and thereby provides the continuously variable shift control of the continuously variable transmission portion 18 to change the gear ratio 70 of the continuously variable transmission portion 18.

The vehicle control apparatus 100 selectively establishes the motor running mode or the hybrid running mode as the running mode depending on the driving state of the vehicle 10, so as to cause the vehicle 10 to run in a selected one of the running modes. For example, the vehicle control apparatus 100 establishes the motor running mode when the required drive power Prdem is in a motor running region smaller than a predetermined threshold value, and establishes the hybrid running mode when the required drive power Prdem is in a hybrid running region equal to or larger than the predetermined threshold value.

The vehicle control apparatus 100 is capable of executing, as a drive control for driving the vehicle 10, a selected one of a manual drive control for driving the vehicle 10 in accordance with driving operations made by the vehicle driver and an automatic drive control for automatically driving the vehicle 10 without depending on the driving operations made by the vehicle driver. In the automatic drive control, for example, the vehicle 10 is accelerated, decelerated, braked and steered, depending on a target driving state that is automatically determined based on, for example, a map information and a destination point inputted by the vehicle driver. When an automatic drive mode is selected with an automatic-drive selecting switch of the drive-assist setting switches 84 being placed in ON by the vehicle driver, the vehicle control apparatus 100 establishes the automatic drive mode so as to execute the automatic drive control.

Figure 2:
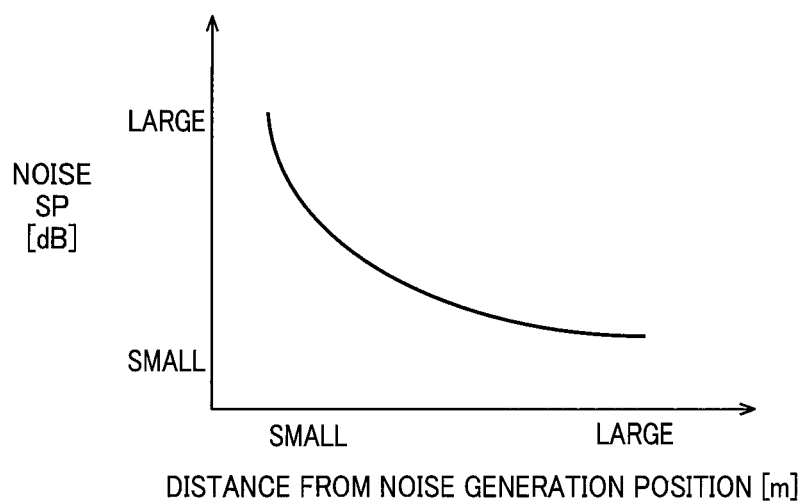
FIG. 2 is a view showing a relationship between a level of the noise and a distance from a noise generation position (i.e., position in which the noise is generated) to a sound collecting device.

By the way, if the noise is propagated into the vehicle cabin, the vehicle driver feels uncomfortable. Since it is necessary to locate the noise-causing sound source in order to eliminate the noise, the sound-source search system 8 described below is used to search the noise-causing sound source that causes the noise. Where the noise-causing sound source is searched by using the sound-source search system 8, since the sound pressure SP is reduced with increase of a distance of the sound-source search device 94 from a noise generation position, as indicated in a noise characteristic shown in FIG. 2, an accuracy of presuming the noise-causing sound source by the sound-source search system 8 is reduced if the search device 94 is installed in a position far from the noise generation position. Therefore, it is necessary to appropriately determine an installed position in which the search device 94 is to be installed. However, since the noise could be caused by various factors, it is difficult to appropriately determine the installed position in which the search device 94 is to be installed, thereby problematically increasing burden to an inspector who performs a sound-source searching operation.

In the sound-source search system 8 according to the present embodiment, driving information related to the driving state of the vehicle 10 upon generation of the noise is acquired, and sound-source candidates, which are likely to be the sound source, are determined or extracted based on the acquired driving information. Then, the sound measuring position of the search device 94, which is dependent on each of the sound-source candidates, is determined or set based on a predetermined relationship between each of the sound-source candidates and the sound measuring position, and the sound measuring position is informed to the inspector, thereby making it possible to accurately presume the noise-causing sound source with an increased accuracy without increasing the burden to the inspector.

The sound-source search system 8 is constituted by the search device 94, the vehicle control apparatus 100 that is provided in the vehicle 10, the transceiver 90 and the gateway ECU 92 cooperating with each other to enable the wireless communication between the search device 94 and the vehicle control apparatus 100, and the server 200. In the sound-source search system 8, each of the search device 94 and the server 200 is an external device that is present apart from the vehicle 10.

The sound-source search system 8 is a system that is to be controlled by exclusively the search control device 94b of the search device 94. There will be described control functions of the search control device 94b. The search control device 94b functionally includes: a noise determining means in the form of a noise determining portion 102; a driving-state acquiring means in the form of a driving-state acquiring portion 104; a sound-source-candidate extracting means in the form of a sound-source-candidate extracting portion 106; a measuring-position setting means in the form of a measuring-position setting portion 108; a measuring-position checking means in the form of a measuring-position checking portion 110; a sound-source presuming means in the form of a sound-source presuming portion 112; and a display controlling means in the form of a display controlling portion 114. There will be described control functions of these portions included in the search control device 94b.

Figure 3:
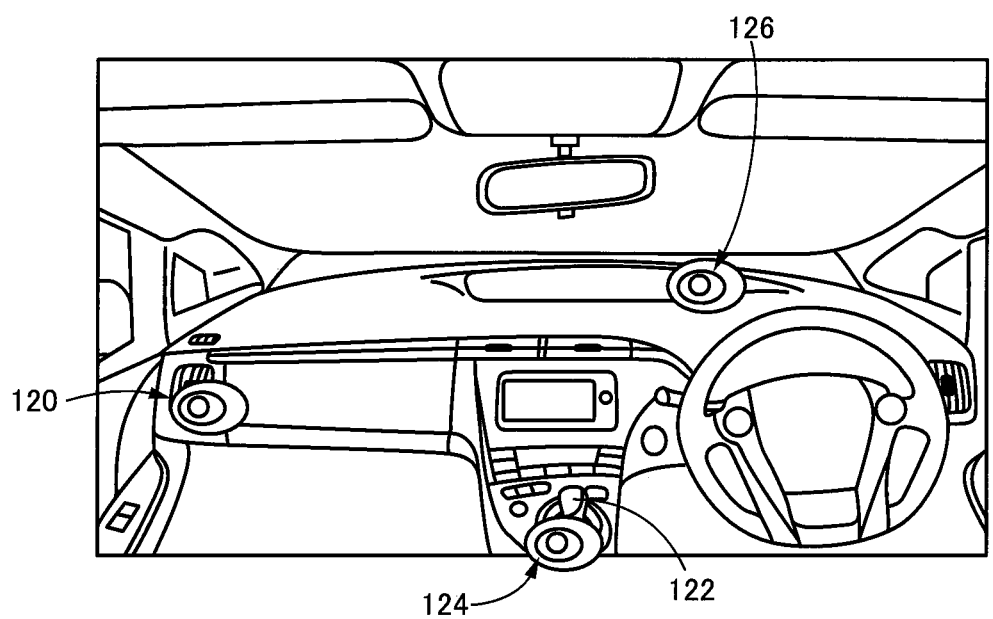
FIG. 3 is an imaginary view showing an interior of the vehicle cabin, when the noise is generated from a blow-out hole located on a side of a front seat, a blow-out hole located in a center of the vehicle cabin and a shift-lever mounting portion.
Figure 4:
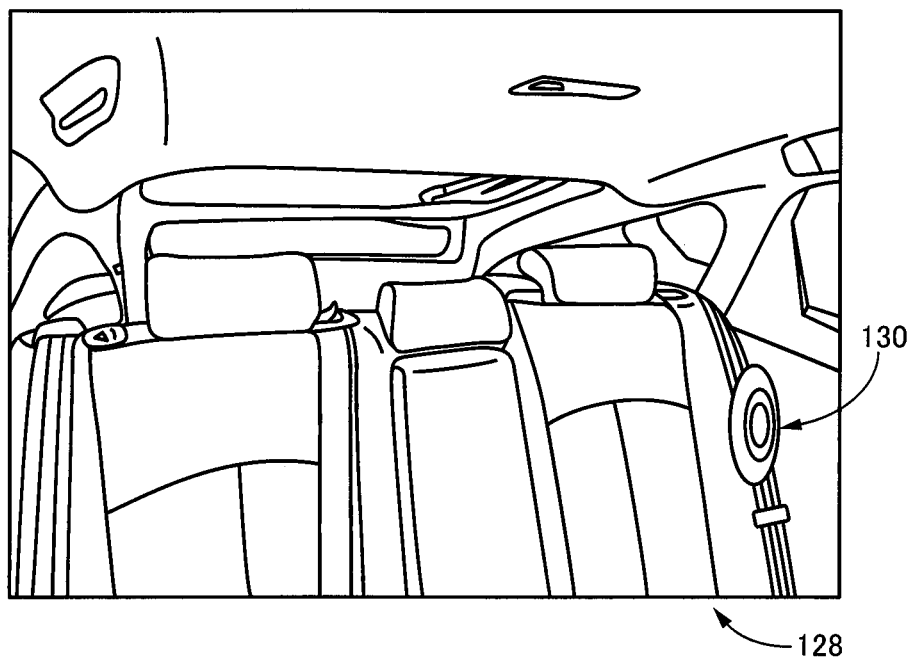
FIG. 4 is an imaginary view showing the interior of the vehicle cabin, when the noise is generated from a clearance on a left side of a rear seat.

The noise determining portion 102 determines whether the noise is generated or not during running of the vehicle 10, based on the sound data acquired based on the sound collected by the search device 94 or a microphone provided apart from the search device 94. The noise is propagated into the vehicle cabin through a blow-out hole 120 located on a side of a passenger seat, a mounting portion 124 of a shift lever 122, a blow-out hole 126 located in a center of the vehicle cabin and other portions that are located on a front seat side in the vehicle cabin, as shown FIG. 3. Further, the noise is propagated into the vehicle cabin also through, for example, a clearance located on a left side of a rear seat 128. Moreover, the noise is propagated into the vehicle cabin also through other holes and clearances. With these being taken into account, a default position of the sound measuring position, in which the search device 94 or the microphone is to be installed for collecting the noise, is set to a position that makes it possible to detect any one of the various noises. It is noted that the sound measuring position does not necessarily have to be a single position but may be two or more positions, for enabling the various noises to be measured.

Figure 5:
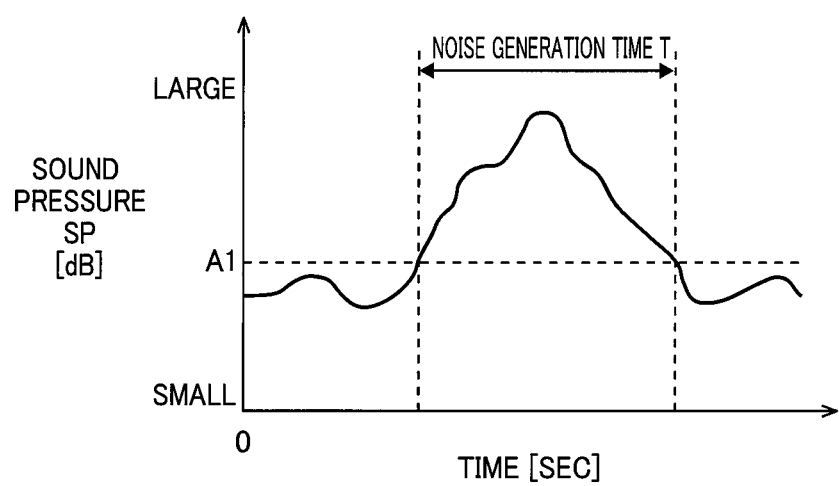
FIG. 5 is a view showing, by way of example, sound data when the noise is generated during running of the vehicle.

The noise determining portion 102 is configured, when the sound collecting by the search device 94 or the microphone has been completed, the sound data acquired based on the collected noise is analyzed, and it is determined whether there has been a time period when the sound pressure SP was not smaller than a predetermined value A1 during running of the vehicle 10. FIG. 5 shows a level of the sound pressure SP as the sound data acquired based on the sound collected during running of the vehicle 10. In FIG. 5, its horizontal axis represents a time during running of the vehicle 10, while its vertical axis represents the sound pressure SP. In an example shown in FIG. 5, the sound pressure SP is not smaller than the predetermined value A1 in a certain time period. When a state in which the sound pressure SP is not smaller than the predetermined value A1, as shown in FIG. 5, is detected, the noise determining portion 102 determines that the noise is generated. The predetermined value A1 is a prestored value, which is obtained by experimentation or determined by an appropriate design theory such that the vehicle driver feels uncomfortable even in presence of a background noise as long as the sound pressure SP is not smaller than the predetermined value A1.

On the other hand, when the sound pressure SP has not been at least the predetermined value A1, namely, when the sound pressure SP has been always smaller than the predetermined value A1, as a result of analysis of the sound data based on the sound collected during running of the vehicle 10, it is determined that the noise is not detected. In this instance, the noise determining portion 102 supplies, to the display controlling portion 114, a command requesting the display 94c to indicate that the noise has not been detected. When receiving the command, the display controlling portion 114 causes the display 94c to indicate that the noise has not been detected. The display controlling portion 114 is a control portion configured to control a display operation of the display 94c of the search device 94, in accordance with commands supplied from various control portions such as the noise determining portion 102.

Further, the noise determining portion 102 does not have to determine the generation of the noise necessarily by collecting the noise during running of the vehicle 10, but may determine the generation of the noise also based on information provided by an user (vehicle driver) to a vehicle dealer. For example, the server 200 stores therein various information related to the noise and provided by the user to the vehicle dealer or the like, and the noise determining portion 102 determines that the noise has been generated when acquiring, from the server 200, information that the noise has been generated in a certain driving state. It is noted that the information related to the noise does not have to be transmitted necessarily via the server 200 but may be transmitted directly to the inspector.

The driving-state acquiring portion 104 has a function of acquiring the driving state upon generation of the noise. When the noise is being collected and the sound pressure SP being measured, the driving-state acquiring portion 104 constantly stores therein the driving state of the vehicle 10 through the wireless communication via the transceiver 90, for example, from the vehicle control apparatus 100. In the present embodiment, the running speed V and the accelerator opening degree θacc are constantly stored or updated as values related to the driving state of the vehicle 10. Further, when the noise is detected during collection of the sound, the driving-state acquiring portion 104 acquires the driving state (i.e., the running speed V and accelerator opening degree θacc) in a time period in which the noise is generated. In this instance, the output rotational speed No may be acquired in place of the running speed V, and the throttle-valve opening degree θth or required drive force Frdem may be acquired in place of the accelerator opening degree θacc. Further, when it is determined that the noise is generated, for example, based on the information related to the noise and provided from the server 200, the driving-state acquiring portion 104 acquires the driving state upon generation of the noise, from the server 200 by using the wireless communication.

Figure 6:
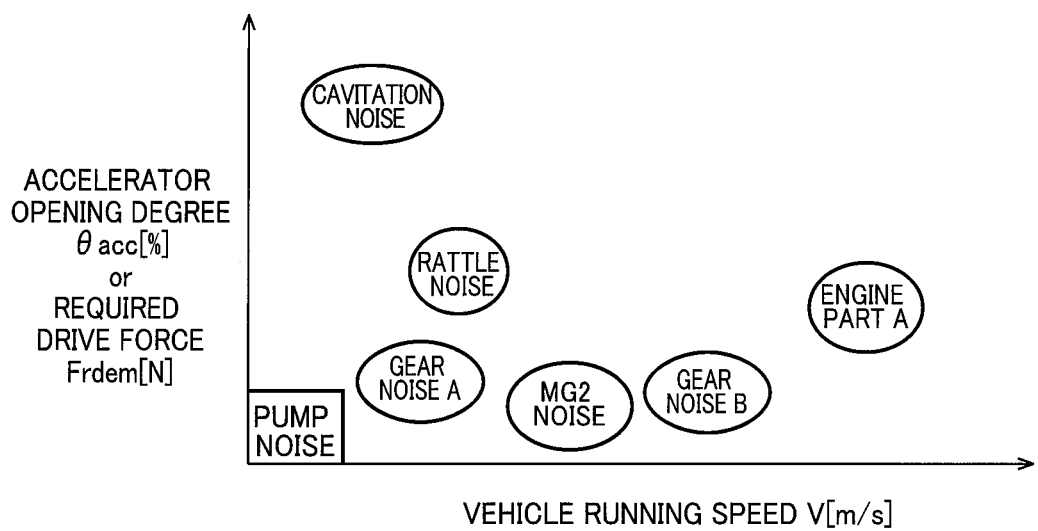
FIG. 6 is a view showing, by way of example, a sound-source candidate map that is to be used for extracting a sound-source candidate or candidates.

The sound-source candidate extracting portion 106 extracts a sound-source candidate that is a candidate of the noise-causing sound source, based on the acquired driving state. In this instance, the sound-source candidate extracting portion 106 extracts the sound-source candidate, by applying the acquired driving state to a sound-source candidate map shown in FIG. 6. FIG. 6 is a view showing, by way of example, the sound-source candidate map that is to be used for extracting the sound-source candidate, based on the acquired driving state. In FIG. 6, its horizontal axis represents the running speed V while its vertical axis represents the accelerator opening degree θacc (or the required drive force Frdem). As shown in FIG. 6, a plurality of sound-source candidates are defined in the map, wherein each of the sound-source candidates is to be extracted depending on the driving state that is defined by a combination of the running speed V and the accelerator opening degree θacc (or the required drive force Frdem).

For example, when the driving state upon generation of the noise is that the running speed V is low and the accelerator opening degree θacc is low, a pump noise is extracted as the sound-source candidate from the sound-source candidate map of FIG. 6. When the driving state upon generation of the noise is that the running speed V is relatively high and the accelerator opening degree θacc is low, a gear noise B is extracted as the sound-source candidate from the sound-source candidate map of FIG. 6. It is noted that, even when the driving state upon generation of the noise is deviated from one of the sound-source candidates in the sound-source candidate map of FIG. 6, if the deviation is so small that the driving state is close to the one of the sound-source candidates, the one of the sound-source candidates may be extracted as the sound-source candidate. Where two or more of the sound-source candidates could be the noise-causing sound source so as to be extracted, one of the extracted sound-source candidates having the highest probability is set to a first candidate, and another one of the extracted sound-source candidates having the second highest probability is set to a second candidate. That is, the plurality of extracted sound-source candidates are ranked in accordance with a degree of the probability. For example, when the driving state upon generation of the noise is within a driving state range of one of the extracted sound-source candidates and is close to the driving state range of another one of the extracted sound-source candidates, the one of the extracted sound-source candidates is set to the first candidate, and the other one of the extracted sound-source candidates is set to the second candidate. The driving state range of each of the sound-source candidates is defined by a corresponding rectangular or circle in the sound-source candidate map of FIG. 6.

The sound-source candidate map of FIG. 6 is obtained by experimentation or determined by an appropriate design theory, for each of various types of vehicles or various types of drive systems. The sound-source candidate maps for the various types are stored, for example, in the search control device 94b of the search device 94 or in the server 200, such that the stored maps are sorted depending on the type of vehicle or drive system. Where the sound-source candidate maps for the various types are stored in the server 200, one of the maps, which corresponds to the vehicle 10, may be referred through the wireless communication, as needed, when the sound-source candidate is to be extracted. Further, when the sound-source candidate maps have been updated to new maps, the new maps may be transmitted from the server 200 to the search control device 94b through the wireless communication, so that the sound-source candidate maps stored in the search control device 94b can be updated to the new maps.

The measuring-position setting portion 108 sets the sound measuring position of the search device 94, which is dependent on the extracted first candidate (sound-source candidate). The measuring-position setting portion 108 sets the sound measuring position of the search device 94, based on a related map that defines the sound measuring position suitable for presuming whether the noise is generated from the sound-source candidate or not. FIG. 7 shows an example of the related map defining the sound measuring position of the search device 94 for each of the sound-source candidates. In FIG. 7, its left column represents the sound-source candidate, its center column represents a first measuring position, and its right column represents a second measuring position. In the present embodiment, the first and second measuring positions are set as the sound measuring position of the search device 94.

As shown in FIG. 7, when the sound-source candidate is a transmission gear noise (gear noise), for example, the first measuring position is set to a position of a center console and the second measuring position is set to a position of the shift lever. Further, when the sound-source candidate is a transmission oil pump (pump noise), for example, the first measuring position is set to the position of the shift lever and the second measuring position is set to a position of a driver-seat-side window. Thus, the measuring-position setting portion 108 is configured, when the sound-source candidate is the transmission gear noise, for example, to set the first measuring position to the position of the center console, and to set the second measuring position to the position of the shift lever.

The related map of FIG. 7 is obtained by experimentation or determined by an appropriate design theory, for each of various types of vehicles or various types of drive systems. The related maps for the various types are stored, for example, in the search control device 94b of the search device 94 or in the server 200, such that the stored maps are sorted depending on the type of vehicle or drive system. Where the related maps for the various types are stored in the server 200, one of the maps, which corresponds to the vehicle 10, may be referred through the wireless communication, as needed, when the sound measuring position is to be set. Further, when the related maps have been updated to new maps, the new maps may be transmitted from the server 200 to the search control device 94b through the wireless communication, so that the related maps stored in the search control device 94b can be updated to the new maps. It is noted that the first measuring position is set to a position in which the sound pressure SP is maximized when the noise is generated from the sound-source candidate. The second measuring position is set to a position that will be described later.

Figure 8:
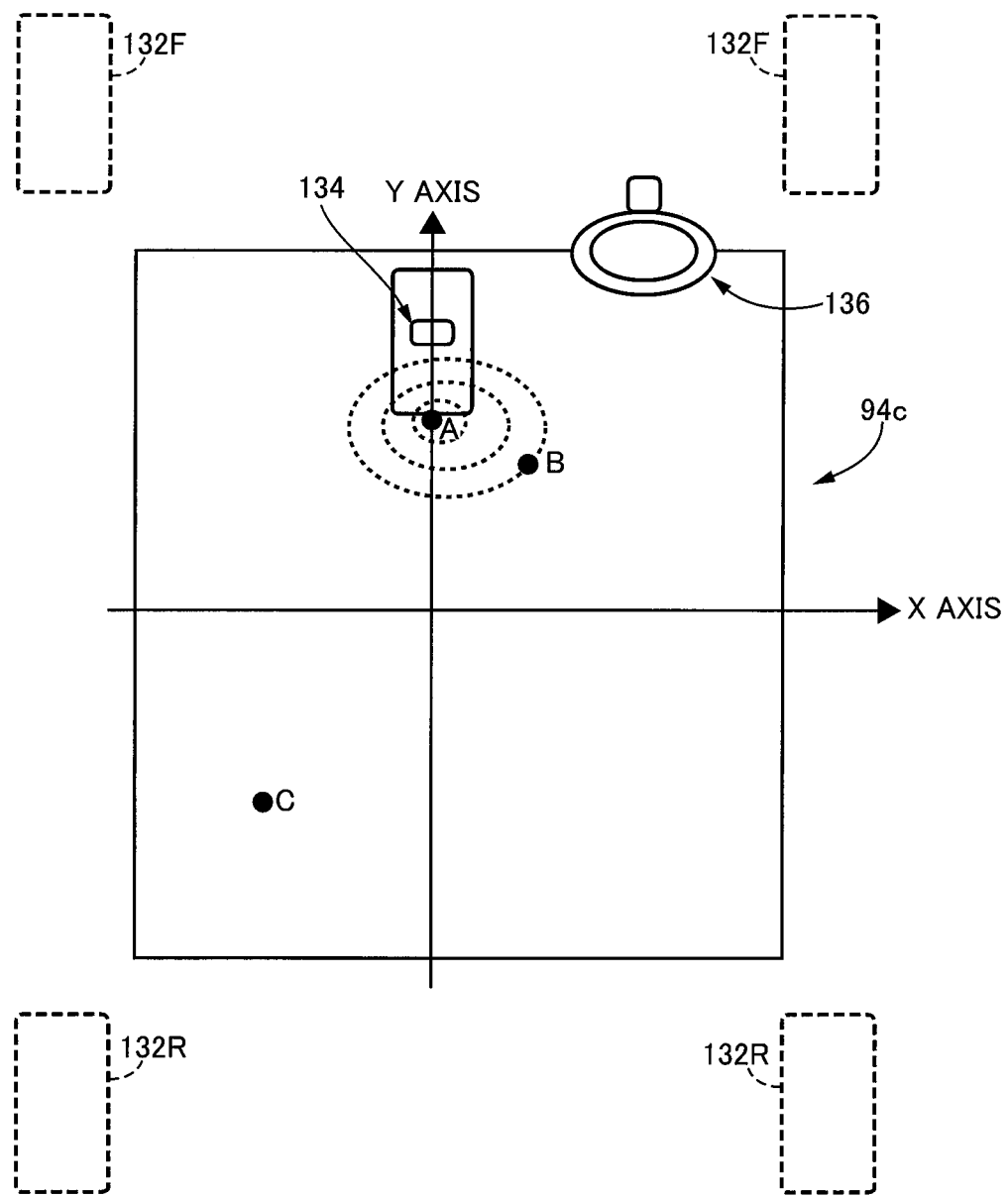
FIG. 8 is an imaginary view showing the interior of the vehicle cabin.

When the first candidate (sound-source candidate) and the first measuring position for the first candidate are determined, the display controlling portion 114 causes the display 94c of the search device 94 to indicate the determined first candidate and first measuring position. In this instance, the display controlling portion 114 causes the display 94c to display an image schematically showing the interior of the vehicle cabin as shown in FIG. 8. It is noted that the display 94 may be constituted by a vehicle display provided in a driver seat of the vehicle 10, or a display of a mobile device such as a personal computer carried by the inspector.

FIG. 8 is the image displayed in the display 94c and schematically showing the interior of the vehicle cabin. In FIG. 8, a part surrounded by a rectangle of a solid line corresponds to the interior of the vehicle cabin. Further, in FIG. 8, broken lines provided in an upper-side portion of the drawing sheet represent imaginary front wheels 132F, and broken lines provided in a lower-side portion of the drawing sheet represent imaginary rear wheels 132R. The imaginary front and rear wheels 132F, 132R may be omitted except where the search device 94 is provided outside the vehicle cabin. In the display 94c, the interior of the vehicle cabin is represented in two dimensional manner, and an imaginary shift lever 134 corresponding to the shift lever 122 (see FIG. 3) and an imaginary steering wheel 136 corresponding to the steering wheel are shown.

A position A shown in FIG. 8 corresponds to the first measuring position. With the position A (corresponding to the first measuring position) being indicated on the display 94c, the inspector can recognize the first measuring position. Thus, with the first measuring position being indicated on the display 94c, the inspector can position or install the search device 94 in the first measuring portion, without doubt. FIG. 8 shows an example in which a MG2 noise is extracted as the sound-source candidate and the first measuring position of the search device 94 is set to the position of the center console.

When the search device 94 is installed by the inspector in the first measuring position, the measuring-position checking portion 110 checks whether the search device 94 has been successfully or correctly installed in the first measuring position or not. In this instance, the measuring-position checking portion 110 causes the search device 94 outputs a soundwave or the like in a vehicle width direction and in a vehicle running direction, so as to calculate the actually installed position of the search device 94, based on a reflected wave that is a reflection of the soundwave, and so as to calculate an amount of deviation D (hereinafter referred to as "deviation amount D) of the actually installed position from the first measuring position. The deviation amount D is calculated in two directions, i.e., in the vehicle width direction (X-axis direction in FIG. 8) and in the vehicle running direction (Y-axis direction in FIG. 8). The measuring-position checking portion 110 determines that the search device 94 is correctly installed in the first measuring position when the calculated deviation amount D is within a range of a predetermined allowable value DA. When it is determined that the search device 94 is correctly installed in the first measuring position, the measuring-position checking portion 110 supplies, to the display controlling portion 114, a command requesting the display 94c to indicate an instruction for measuring the noise.

On the other hand, when the deviation amount D of the actually installed position of the search device 94 from the first measuring position exceeds the allowable value DA, the measuring-position checking portion 110 determines that the search device 94 is not correctly installed in the first measuring position. In this instance, the measuring-position checking portion 110 supplies, to the display controlling portion 114, a command requesting the display 94c to indicate the deviation amount D as a correction amount F by which the installed position of the search device 94 is to be corrected, whereby the correction amount F of the search device 94 is informed to the inspector. For example, on the imaginary vehicle cabin shown in FIG. 8, the actually installed position of the search device 94 relative to the first measuring position is indicated, and/or a correction amount Fx in the vehicle width direction and a correction amount Fy in the vehicle running direction are indicated by numerical values (e.g., several millimeters to plus side in the X-axis direction, several millimeters to minus side in the Y-axis direction). By seeing the correction amount F (deviation amount D) indicated in the display 94c, the inspector can correctly position the search device 94 in the first measuring position. When the installed position of the search device 94 has been corrected, it is determined that the search device 94 is correctly installed in the first measuring position, and the display 94c is caused to indicate the instruction for measuring the noise. Following the instruction indicated in the display 94c, the inspector measures the noise. The measurement of the noise is made by causing the vehicle 10 to run with the driving state in which the first candidate (sound-source candidate) is likely to be the noise-causing sound source, and causing the search device 94 to collect the sound generated inside the vehicle cabin during running of the vehicle 10 with such a driving state.

Figure 9:
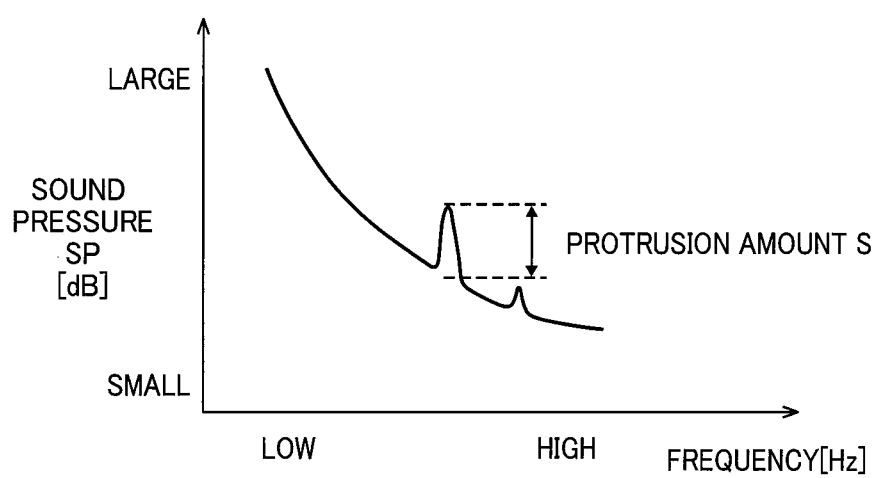
FIG. 9 is a view showing a relationship between a frequency and a sound pressure when the noise is generated.

When the measurement of the noise has been completed with the search device 94 being installed in the first measuring position, the sound-source presuming portion 112 determines whether there is a possibility that the first candidate is the noise-causing sound source or not, based on a result of the measurement of the noise, namely, based on the sound data acquired based on the sound collected by the search device 94 installed in the first measuring position. More specifically, the sound-source presuming portion 112 determines whether an amount S of protrusion (hereinafter referred to as "protrusion amount S") of the sound pressure SP is at least a predetermined value or not in a certain frequency range in which the noise is to be generated when the first candidate is the noise-causing sound source. FIG. 9 is a view showing a relationship between a frequency and the sound pressure SP when the noise is generated. In FIG. 9, its horizontal axis represents the frequency [Hz], and its vertical axis represents the sound pressure SP [dB]. As shown in FIG. 9, the sound pressure SP is caused to protrude in the certain frequency range when the noise is generated. When the sound pressure SP is caused to protrude, the sound protruding out of the background noise is transmitted as the noise to the vehicle driver. It is noted that the certain frequency range in which the noise is be generated varies depending on the sound-source candidate. For example, as shown in FIG. 6, the driving state in which the noise is generated is dependent on the sound-source candidate, so that the frequency range of the noise generated in a driving state corresponds to the frequency range of the noise generated by the sound-source candidate that is likely to be the noise-causing sound source in the same driving state. In connection with this, the frequency range of the noise when each sound-source candidate becomes the noise-causing sound source is a prestored value, which is obtained by experimentation or determined by an appropriate design theory. Further, the above-described predetermined value, which is used for the determination of generation of the noise, is a smallest value which makes the vehicle driver perceive the noise during running of the vehicle 10 and which is obtained by experimentation or determined by an appropriate design theory. This predetermined value may be changed as needed depending on the sound-source candidate and the frequency range.

The sound-source presuming portion 112 determines that there is no possibility that the first candidate is the noise-causing sound source, when the protrusion amount S of the sound pressure SP is smaller than the predetermined value in the certain frequency range in which the noise is to be generated when the first candidate is the noise-causing sound source, or when the protrusion amount S of the sound pressure SP is increased in a frequency range different from the above-described certain frequency range. In this instance, the sound-source presuming portion 112 supplies, to the display controlling portion 114, a command requesting the display 94c to indicate that the possibility that the first candidate is the noise-causing sound source is low. In addition, the sound-source presuming portion 112 ranks the second candidate up to the first candidate, namely, sets the second candidate as the new first candidate, and supplies, to the display controlling portion 114, a command requesting the display 94c to indicate the new first candidate and the first measuring position dependent on the new first candidate, so as to instruct the inspector to measure the noise regarding the new first candidate. It is noted that, when the second candidate is ranked up to the first candidate where there are other candidates such as a third candidate, each of the other candidates is also ranked up by one level.

On the other hand, when the protrusion amount S of the sound pressure SP is not smaller than the predetermined value in the certain frequency range in which the noise is to be generated when the first candidate is the noise-causing sound source, the measuring-position setting portion 108 sets the second measuring position in accordance with the related map of FIG. 7. Then, the measuring-position setting portion 108 supplies, to the display controlling portion 114, a command requesting the display 94c to indicate an instruction for installing the search device 94 in the second measuring position. The second measuring position is set for the purpose of increasing an accuracy of presuming whether the first candidate is the noise-causing sound source or not. For example, the second measuring position is set to a position in which the sound pressure SP is smaller than in the first measuring position by a predetermined difference value when the noise is generated from the sound-source candidate.

As shown in FIG. 7, when the noise-causing sound source is the transmission gear noise, the first measuring position is set to a position of the center console, and the second measuring position is set to a position of the shift lever. The position of the center console is a position in which the sound pressure SP is maximized when the noise-causing sound source is the transmission gear noise, and the position of the shift lever is a position in which the sound pressure SP is smaller than in the position of the center console by the predetermined difference value when the noise-causing sound source is the transmission gear noise. Further, when the noise-causing sound source is an engine part A, the first measuring position is set to a position of a blow-out hole located in a vehicle driver seat, and the second measuring position is set to a position distant from the first measuring position by a predetermined distance. The position of the blow-out hole is a position in which the sound pressure SP is maximized when the noise-causing sound source is the engine part A, and the position distant from the first measuring position by the predetermined distance is a position in which the sound pressure SP is smaller than in the position of the blow-out hole by the predetermined difference value when the noise-causing sound source is the engine part A.

When the search device 94 is installed by the inspector in the second measuring position, the measuring-position checking portion 110 checks whether the search device 94 has been successfully or correctly installed in the second measuring position or not. The specific manner of the checking and the method of correction in case of failure in the correct installment of the search device 94 in the second measuring position are substantially the same as in the above-described installment in the first measuring position, and accordingly are not described. When the search device 94 is correctly installed in the second measuring position, the display 94c is caused to indicate the instruction for measuring the noise. Following the instruction indicated in the display 94c, the inspector measures the noise.

When the measurement of the noise has been completed with the search device 94 being installed in the second measuring position, the sound-source presuming portion 112 determines whether the possibility that the first candidate is the noise-causing sound source is high or not, namely, presumes whether the first candidate is the noise-causing sound source or not, based on a result of the measurement of the noise, namely, based on the sound data acquired based on the sound collected by the search device 94 installed in the second measuring position. The sound-source presuming portion 112 determines whether the possibility that the first candidate is the noise-causing sound source is high or not, depending on whether or not the amount S of protrusion of the sound pressure SP is smaller than in the first measuring position by the predetermined difference value in the certain frequency range in which the noise is to be generated when the first candidate is the noise-causing sound source. As described above, the second measuring position is set to a position in which the sound pressure SP is smaller than in the first measuring position by the predetermined difference value. Therefore, when the sound pressure SP measured in the second measuring position is smaller than the sound pressure SP measured in the first measuring position by the predetermined difference value, the sound-source presuming portion 112 determines that the possibility that the sound-source candidate is the noise-causing sound source is high. The predetermined difference value is obtained by experimentation or determined by an appropriate design theory, and is changed as needed depending on the sound-source candidate. When determining that the possibility that the sound-source candidate is the noise-causing sound source is high based on a result of the measurement made in the second measuring position, the sound-source presuming portion 112 supplies, to the display controlling portion 114, a command requesting the display 94c to indicate that the sound-source candidate is presumed to be the noise-causing sound source.

On the other hand, the sound-source presuming portion 112 determines that the possibility that the first candidate is the noise-causing sound source is low, when the sound pressure SP measured in the second measuring position is larger than the sound pressure SP measured in the first measuring position, and when the sound pressure SP measured in the second measuring position is considerably smaller than the sound pressure SP measured in the first measuring position. In this instance, the sound-source presuming portion 112 ranks the second candidate up to the first candidate, namely, sets the second candidate as the new first candidate, and supplies, to the display controlling portion 114, a command requesting the display 94c to indicates the new first candidate and the first measuring position dependent on the new first candidate, so as to instruct the inspector to measure the noise regarding the new first candidate.

Figure 10:
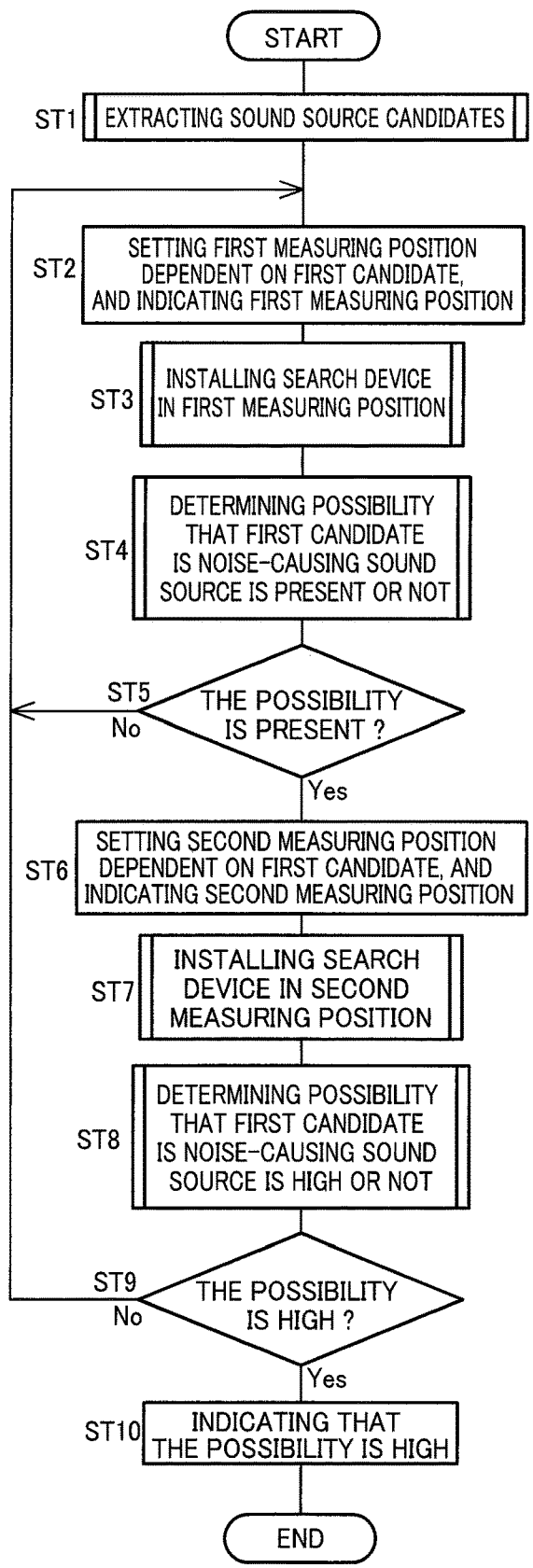
FIG. 10 is a flow chart for explaining a control routine that is to be executed in an inspection process in which the noise-causing sound source is searched by using the sound-source search system.

FIG. 10 is a flow chart for explaining a control routine that is to be executed in an inspection process in which the noise-causing sound source (causing the noise propagated inside the vehicle cabin) is searched by using the sound-source search system 8, namely, for explaining a sound-source search method of searching the noise-causing sound source.

Figure 11:
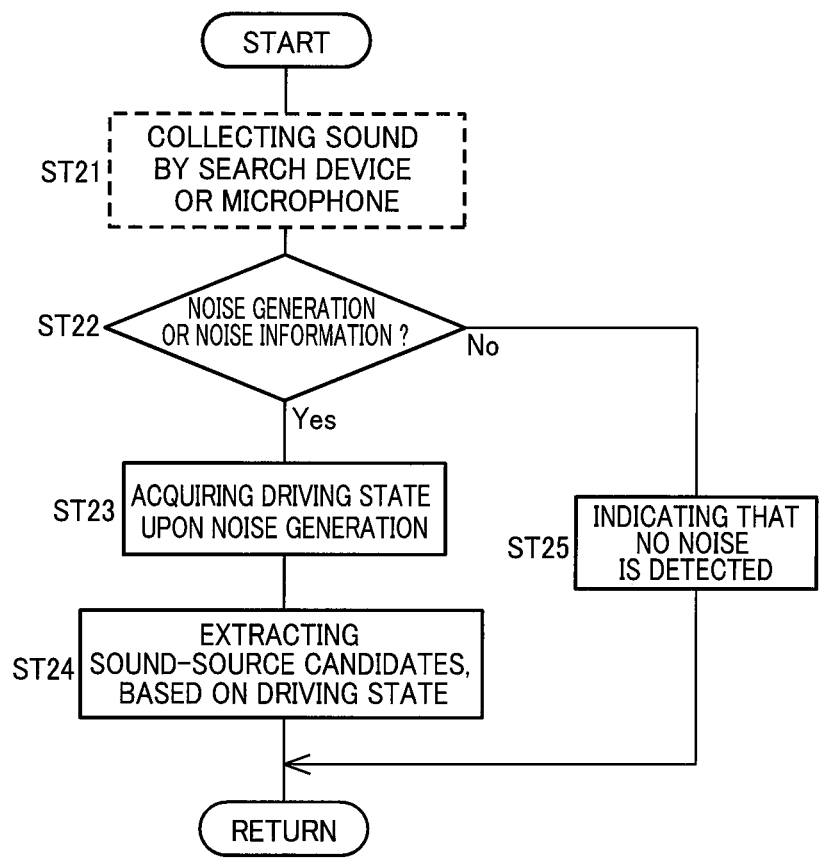
FIG. 11 is a flow chart for explaining a control routine that is to be executed for extracting the sound-source candidate or candidates.

The control routine is initiated with step ST1 corresponding to a sound-source-candidate extracting process executed to extract sound-source candidates each of which is likely to be the noise-causing sound source. The sound-source-candidate extracting process as the step ST1 will be described with reference to a flow chart of FIG. 11. In FIG. 11, step ST21, which is surrounded by broken line, is a step implemented by operation executed by the inspector, and steps ST22-ST25 are control steps executed by the search control device 94b. The sound-source-candidate extracting process, which is shown in the flow chart of FIG. 11, is executed by acquiring the driving information related to the driving state of the vehicle 10 upon generation of the noise, and extracting the sound-source candidates, based on the acquired driving information.

In FIG. 11, ST21 is implemented to collect the sound with use of the search device 94 or other microphone during running or stop of the vehicle 10. Step ST21 is followed by ST22 corresponding to control function of the noise determining portion 102, which is implemented to determine whether the noise has been generated, based on the sound data acquired based on the collected sound, or whether there is a history of generation of the noise in a certain driving state, based on the information provided from the server 200. When a negative determination is made at step ST22, the control flow goes to step ST25 corresponding to control function of the display controlling portion 114, which is implemented to cause the display 94c of the search device 94 to indicate that the noise has not been detected. After implementation of step ST25, one cycle of execution of the control routine is terminated, without implementation of step ST2 and the subsequent steps shown in FIG. 10. When an affirmative determination is made at step ST22, step ST23 corresponding to control function of the driving-state acquiring portion 104 is implemented to acquire the driving state (running speed V, accelerator opening degree θacc) upon generation of the noise. Then, at step ST24 corresponding to control function of the sound-source candidate extracting portion 106, the sound-source candidates are extracted by applying the driving state acquired at step ST23, to the sound-source candidate map of FIG. 6. After implementation of step ST24, the control flow goes back to the control routine of FIG. 10, whereby step ST2 and the subsequent steps are implemented.

Referring back to FIG. 10, at step ST2 corresponding to control functions of the measuring-position setting portion 108 and the display controlling portion 114, the first measuring position dependent on the first candidate that has the highest possibility of the noise-causing sound source among the extracted sound-source candidates, is set based on the related map of FIG. 7 defining the predetermined relationship between each sound-source candidate and the sound measuring position of the search device 94, and then the first measuring position is indicated in the display 94c. Thus, this step ST2 is implemented to cause the informing device in the form of the display 94c to inform the first measuring position which is dependent on the extracted sound-source candidate, and which is set based on the predetermined relationship between the sound-source candidate and the sound measuring position of the search device 94.

Figure 12:
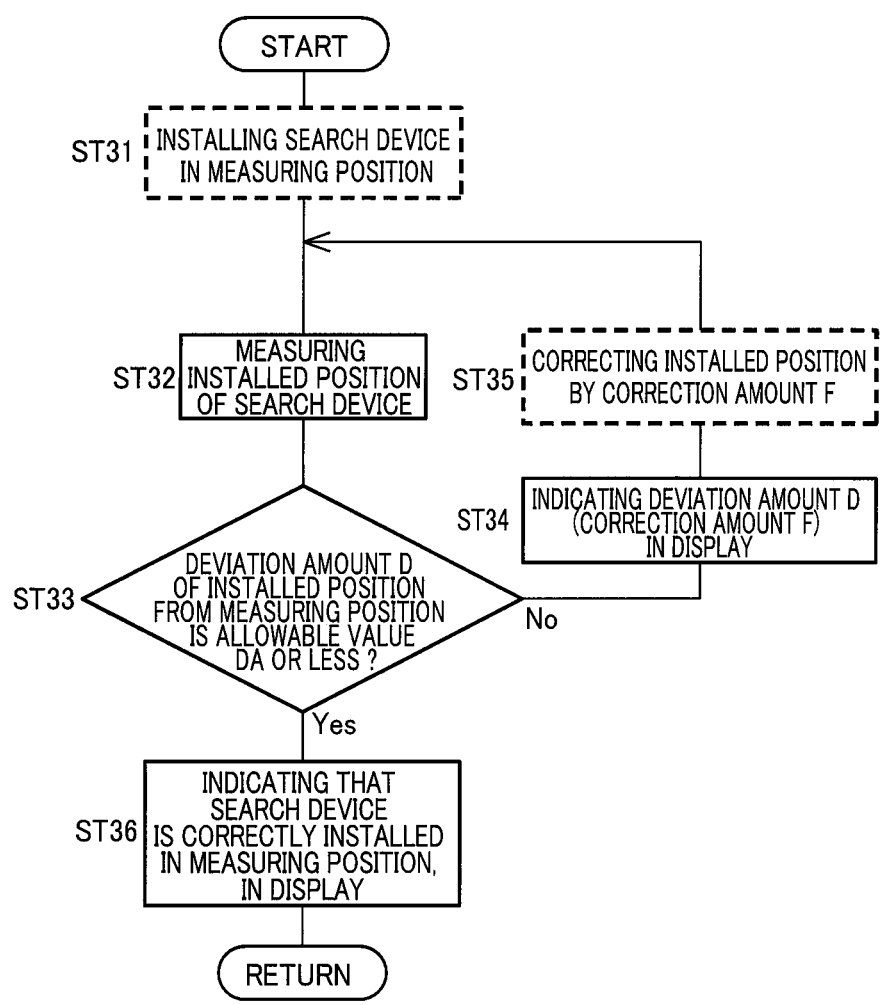
FIG. 12 is a flow chart for explaining a control routine that is to be executed for positioning the search device in a first measuring position.

Step ST2 is follows by step ST3 corresponding to a first search-device installing process of installing the search device 94 in the first measuring position. The first search-device installing process as the step ST3 will be described with reference to a flow chart of FIG. 12. In FIG. 12, steps ST31 and ST35, which are surrounded by broken lines, are steps implemented by operations executed by the inspector, and steps ST32-ST34 and ST36 are control steps executed by the search control device 94b.

At step ST31 shown in FIG. 12, the inspector installs the search device 94 in the first measuring position in accordance with the indication shown in the display 94c. Then, at step ST 32 corresponding to control function of the measuring-position checking portion 110, the installed position of the search device 94 in the vehicle cabin is measured by the soundwave outputted from the search device 94. Step ST32 is followed by step ST33 corresponding to control function of the measuring-position checking portion 110, which is implemented to calculate the deviation amount D of the installed position of the search device 94 from the first measuring position, and to determine whether the calculated deviation amount D is the allowable value DA or less. When a negative determination is made at step ST33, the control flow goes to step ST34 corresponding to control function of the display controlling portion 114, which is implemented to cause the display 94c to indicate the correction amount F by which the installed position of the search device 94 is to be corrected, wherein the correction amount F is equal to the deviation amount D calculated at step ST33. Step ST34 is followed by step ST35 at which the inspector corrects the installed position of the search device 94 by the correction amount F indicated in the display 94c. After the installed position of the search device 94 has been corrected, the control flow goes back to step ST32 that is implemented to measure the installed position of the search device 94. Then, at step ST33, it is determined whether the search device 94 is correctly positioned in the first measuring position or not. When an affirmative determination is made at step ST33, step ST36 corresponding to control function of the display controlling portion 114 is implemented to cause the display 94c to indicate that the search device 94 is correctly installed in the first measuring position.

Figure 13:
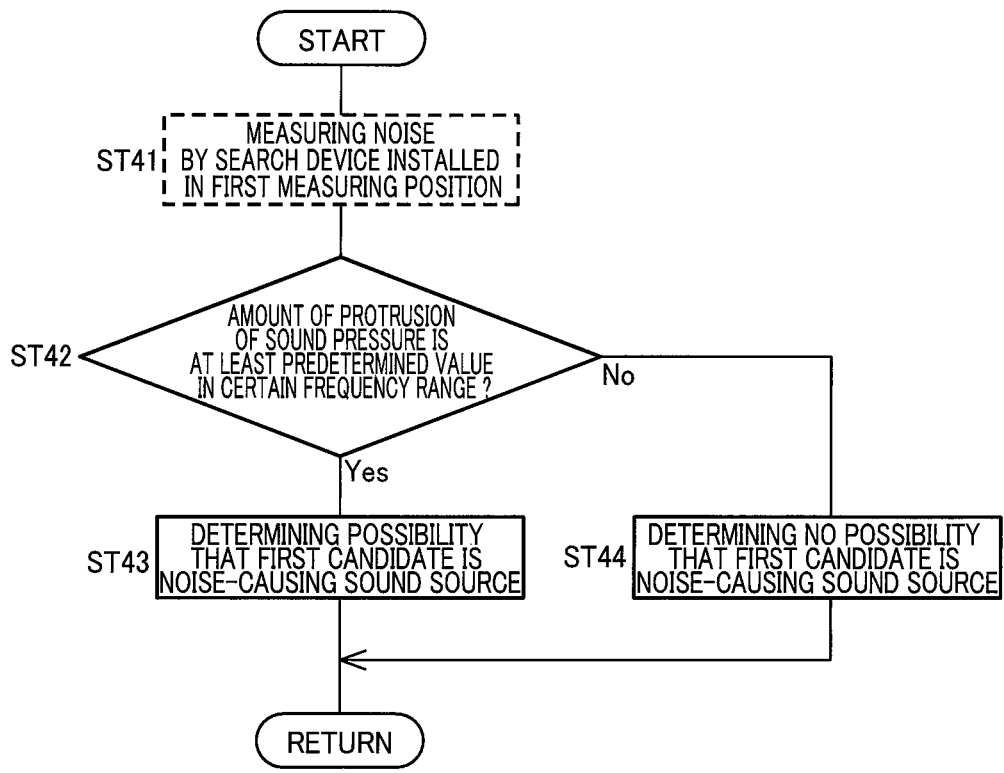
FIG. 13 is a flow chart for explaining a control routine that is to be executed for determining whether there is a possibility that the sound-source candidate is the noise-causing sound source or not.

Referring back to FIG. 10, at step ST4 corresponding to a first sound-source determining process, it is determined whether there is a possibility that the first candidate is the noise-causing sound source or not. The first sound-source determining process as the step ST4 will be described with reference to a flow chart of FIG. 13. In FIG. 13, step ST41, which is surrounded by broken line, is a step implemented by operation executed by the inspector, and steps ST42-ST44 are control steps executed by the search control device 94b.

At step ST41 shown in FIG. 13, the measurement of the noise is executed, namely, the sound data is acquired by collecting and measuring the noise through the search device 94. This step ST41 corresponds to a sound-data acquiring step for causing the search device 94 to acquire the sound data. Then, at step ST42 corresponding to control function of the sound-source presuming portion 112, it is determined, from a result of the measurement made at step ST41, whether the amount S of protrusion of the sound pressure SP is at least the predetermined value in the certain frequency range in which the noise is to be generated when the first candidate is the noise-causing sound source. When an affirmative determination is made at step ST42, step ST43 corresponding to control function of the sound-source presuming portion 112 is implemented to determine that there is a possibility that the first candidate is the noise-causing sound source. When a negative determination is made at step ST42, the control flow goes to step ST44 corresponding to control function of the sound-source presuming portion 112, which is implement to determine that there is no possibility that the first candidate is the noise-causing sound source.

Referring back to FIG. 10, step ST5 corresponding to control function of the sound-source presuming portion 112 is implemented to determine whether it is determined at step ST4 that there is a possibility that the first candidate is the noise-causing sound source, or not. When a negative determination is made at step ST5, namely, when it is determined that there is no possibility that the first candidate is the noise-causing sound source, the second candidate is ranked up to the first candidate, and step ST2 and the subsequent steps are implemented again. When an affirmative determination is made at step ST5, step ST6 corresponding to control functions of the measuring-position setting portion 108 and the display controlling portion 114 is implemented to set the second measuring position, based on the related map of FIG. 7, which defines the relationship between each sound-source candidate and the sound measuring position of the search device 94, and to cause the display 94c to indicate the second measuring position. Thus, this step ST6 is implemented to cause the informing device in the form of the display 94c to inform the second measuring position which is dependent on the extracted sound-source candidate and which is set based on the predetermined relationship between the sound-source candidate and the sound measuring position of the search device 94.

Step ST6 is follows by step ST7 corresponding to a second search-device installing process of installing the search device 94 in the second measuring position. The second search-device installing process as the step ST7 is substantially the same as the above-described step ST3 corresponding to the first search-device installing process. Specifically, the search device 94 is installed in the second measuring position, as shown in the above-described flow chart of FIG. 12.

Figure 14:
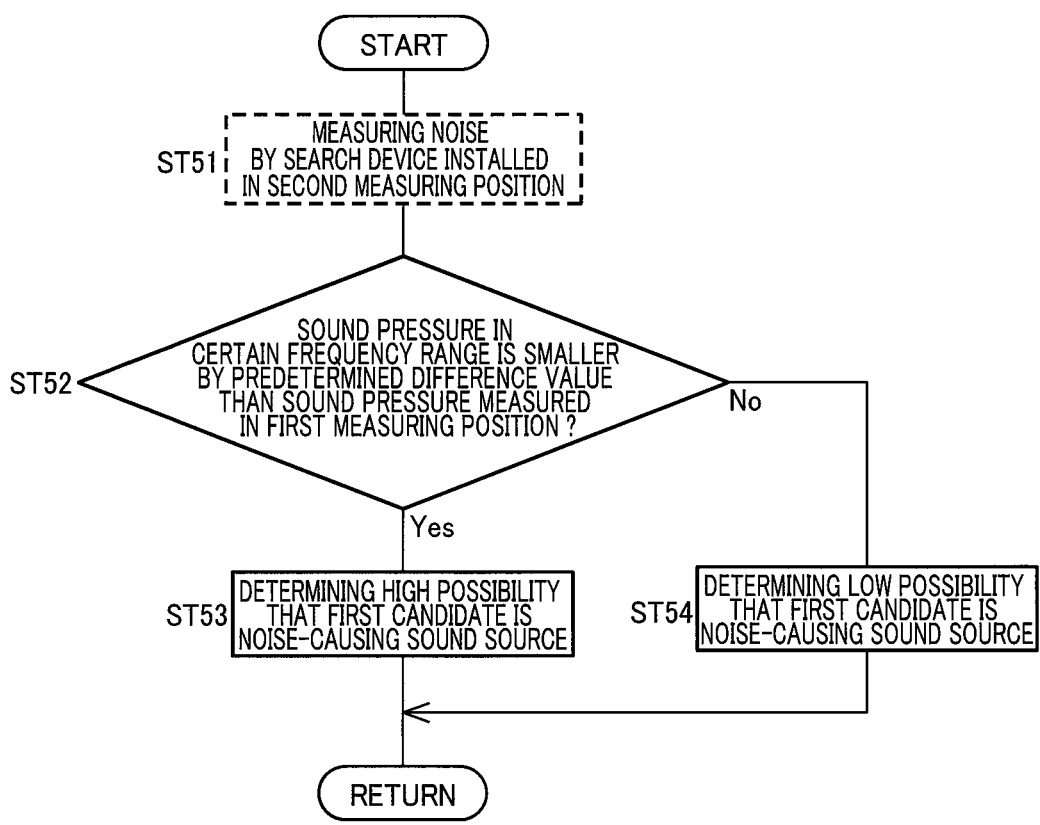
FIG. 14 is a flow chart for explaining a control routine that is to be executed for determining whether the possibility that the sound-source candidate is the noise-causing sound source, is high or not.

Step ST7 is followed by step ST8 corresponding to a second sound-source determining process, it is determined whether the possibility that the first candidate is the noise-causing sound source is high or not. The second sound-source determining process as the step ST8 will be described with reference to a flow chart of FIG. 14. In FIG. 14, step ST51, which is surrounded by broken line, is a step implemented by operation executed by the inspector, and steps ST52-ST54 are control steps executed by the search control device 94b.

At step ST51 shown in FIG. 14, the measurement of the noise is executed, namely, the sound data is acquired by collecting the sound through the search device 94. This step ST51 corresponds to a sound-data acquiring step for causing the search device 94 to acquire the sound data. Then, at step ST52 corresponding to control function of the sound-source presuming portion 112, it is determined, from a result of the measurement made at step ST51, whether the sound pressure SP is smaller than the sound pressure SP measured in the first measuring position by the predetermined difference value in the certain frequency range in which the noise is to be generated when the first candidate is the noise-causing sound source. When an affirmative determination is made at step ST52, step ST53 corresponding to control function of the sound-source presuming portion 112 is implemented to determine that the possibility that the first candidate is the noise-causing sound source is high. When a negative determination is made at step ST52, the control flow goes to step ST54 corresponding to control function of the sound-source presuming portion 112, which is implement to determine that the possibility that the first candidate is the noise-causing sound source is low.

Referring back to FIG. 10, step ST9 corresponding to control function of the sound-source presuming portion 112 is implemented to determine whether it is determined at step ST8 that the possibility that the first candidate is the noise-causing sound source is high or not. When a negative determination is made at step ST9, namely, when it is determined that the possibility that the first candidate is the noise-causing sound source is low, the second candidate is ranked up to the first candidate, and step ST2 and the subsequent steps are implemented again. When an affirmative determination is made at step ST9, step ST10 corresponding to control function of the display controlling portion 114 is implemented to cause the display 94c to indicate that the possibility that the first candidate is the noise-causing sound source is high.

As described above, in the present embodiment, the search control device 94b extracts the sound-source candidate, based on the driving information of the vehicle 10 upon generation of the noise, and causes the display 94c to inform the sound measuring position (first measuring position, second measuring position) which is dependent on the extracted sound-source candidate and which is set based on the predetermined relationship between the sound-source candidate and the sound measuring position, so that it is possible to install the sound-source search device 94 in the sound measuring position that is appropriate for presuming the noise-causing sound source, thereby improving the accuracy of presuming the noise-causing sound source. Further, since the sound measuring position of the sound-source search device 94 is easily determined or set, it is possible to reduce the burden in the sound-source searching operation performed by the inspector.

In the present embodiment, when the sound-source search device 94 is installed in the sound measuring position, it is determined whether the sound-source search device 94 is correctly installed in the sound measuring position (first measuring position, second measuring position) or not. When the deviation amount D of the installed position of the sound-source search device 94 from the sound measuring position exceeds the allowable value DA, the correction amount F by which the installed position of the sound-source search device 94 is to be corrected is informed by the display 94c to the inspector, so that the inspector can easily and correctly install in the sound measuring position, by correcting the installed position of the sound-source search device 94 by the correction amount F informed by the display 94c. Further, since the noise is measured with the sound-source search device 94 being correctly installed in the sound measuring position, the accuracy of presuming the noise-causing sound source is improved. Moreover, it is presumed whether the sound-source candidate is the sound source or not, based on (i) the sound data acquired when the sound is collected and measured by the sound-source search device 94 in the state in which the sound-source search device 94 is installed in the first measuring position and (ii) the sound data acquired when the sound is collected and measured by the sound-source search device 94 in the state in which the sound-source search device 94 is installed in the second measuring position, so that it is possible to further increase the accuracy of presuming whether the sound-source candidate is the noise-causing sound source or not.

There will be next described other embodiments. The same reference signs as used in the above-described first embodiment will be used in the following embodiments, to identify the functionally corresponding elements, and descriptions thereof are not provided.

Second Embodiment

Figure 15:
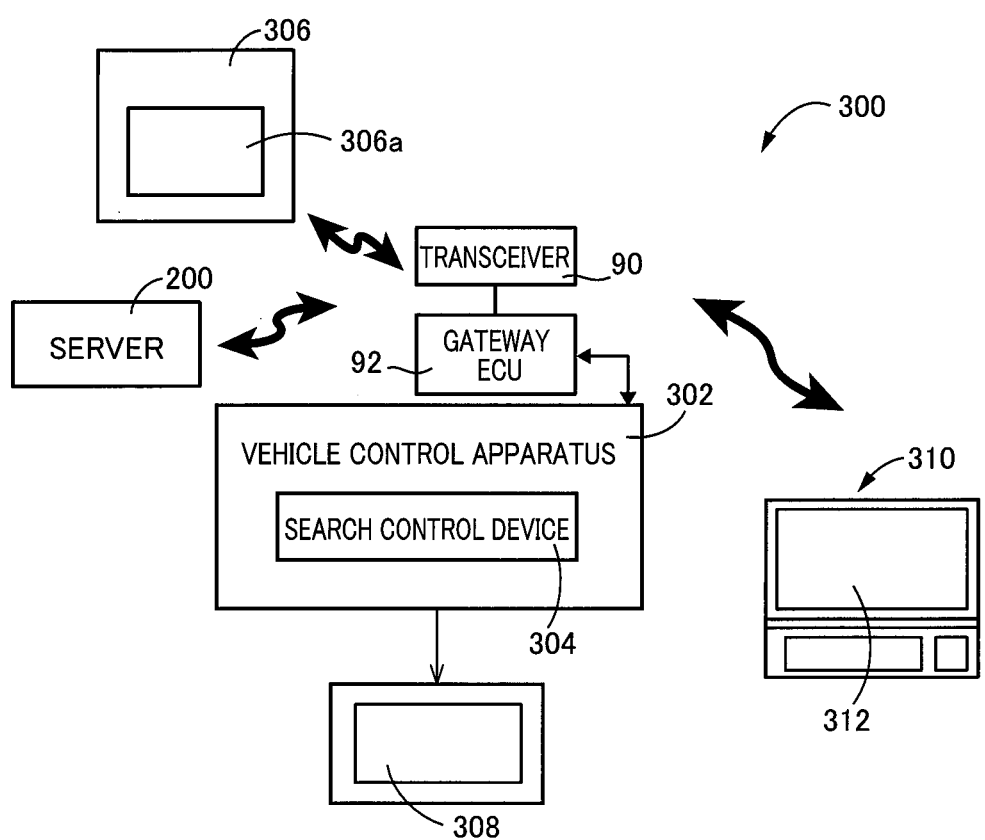
FIG. 15 is a view showing an overall construction of a sound-source search system according to another embodiment of the present invention.

FIG. 15 is a view showing an overall construction of a sound-source search system 300 according to this second embodiment of the present invention. In the present second embodiment, a vehicle control apparatus 302 provided in the vehicle 10 has a function of searing the noise-causing sound source. That is, the vehicle control apparatus 302 includes a search control device 304 having substantially the same function as the search control device 94b in the above-described first embodiment. The search control device 304 may be a device provided apart from a plurality of control devices constituting the vehicle control apparatus 302, wherein the plurality of control devices includes an engine-control control device configured to control the engine 14, or alternatively, may be constituted by one of the plurality of control devices. It is noted that the search control device 304 corresponds to "control device" recited in the appended claims.

In the present second embodiment, a sound-source search device 306 (hereinafter referred to as "search device 306") has a function of measuring the noise during running of the vehicle 10 and a function of measuring the sound measuring position of the search device 306 itself, but does not have a function of extracting the sound-source candidates, a function of setting the sound measuring position dependent on each of the sound-source candidates, a function of determining whether the position of the search device 306 is correct or not, and a function of presuming the noise-causing sound source. The result of measurement made by the search device 306, i.e., the sound data, is transmitted to the vehicle control apparatus 302 provided in the vehicle 10, via the transceiver 90 and the gateway ECU 92.

Further, also between the server 200 and the vehicle control apparatus 302, the information can be transmitted and received through the wireless communication via the transceiver 90 and the gateway ECU 92. For example, when the sound-source candidate map of FIG. 6 or the related map of FIG. 7 is updated, the updated map is transmitted from the server 200 to the vehicle control apparatus 302. Further, when the noise-causing sound source is to be searched, the sound-source candidate map and the related map corresponding to the type and the drive system of the vehicle are transmitted from the server 200 so as to be referred to as need.

Further, in the present second embodiment, the various information such as the extracted sound-source candidates, the first and second measuring positions dependent on each of the extracted sound-source candidates and the deviation amount D (correction amount F) of the installed position of the search device 306 from the sound measuring position are indicated in a display 308 that is provided inside the vehicle cabin. However, the various information may be indicated in a display 306a provided in the search device 306, or in a display 312 provided in a mobile device 310 such as a personal computer which is carried by the inspector. It is noted that the display 308 provided inside the vehicle cabin corresponds to "informing device" recited in the appended claims, and that, where the various information are indicated in the display 306a of the search device 306 or the display 312 of the mobile device 310, the display 306a or the display 312 corresponds to "informing device" recited in the appended claims.

As described above, in the sound-source search system 300 according to the second embodiment, the noise is measured by the search device 306, which is installed in accordance with the information indicated in the display 308 provided inside the vehicle cabin, owing to the control operations made by the search control device 304 of the vehicle control apparatus 302 provided in the vehicle 10. Thus, in the second embodiment, too, the noise-causing sound source can be presumed with an increased accuracy without increasing the burden to the inspector. The specific process of searching the noise-causing sound source is basically the same as in the above-described first embodiment, and accordingly is not described.

Third Embodiment

Figure 16:
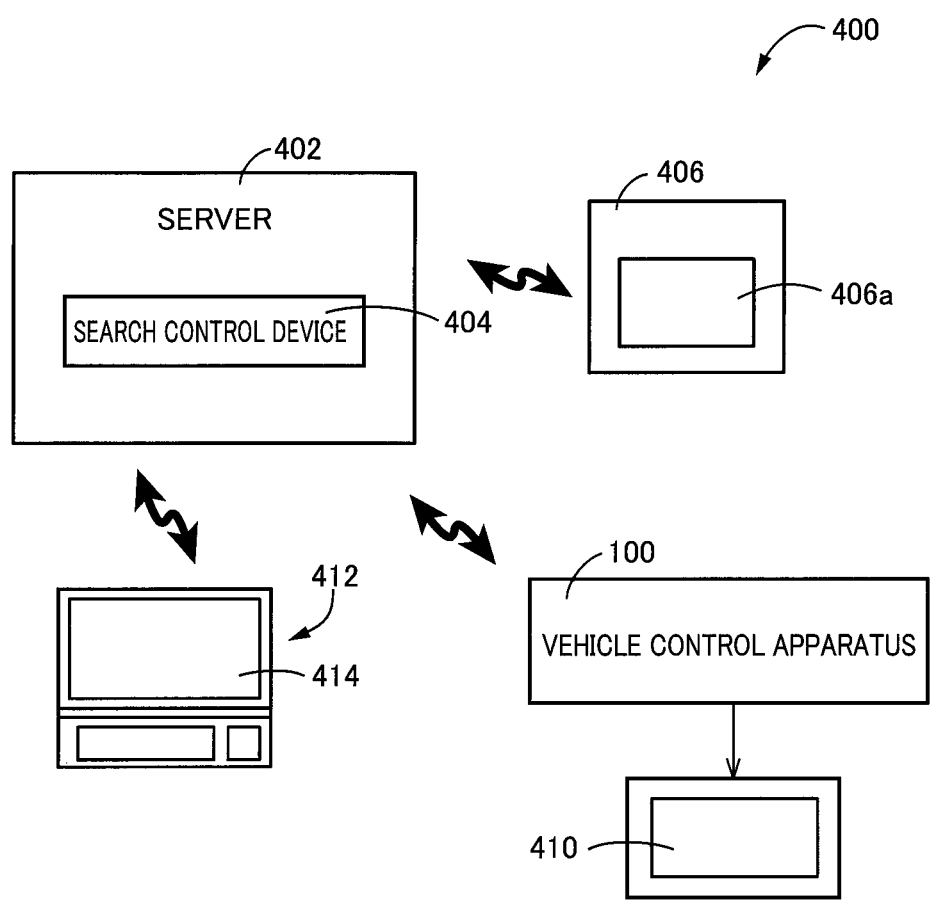
FIG. 16 is a view showing an overall construction of a sound-source search system according to still another embodiment of the present invention.

FIG. 16 is a view showing an overall construction of a sound-source search system 400 according to this third embodiment of the present invention. In the present third embodiment, a server 402 has a function of searing the noise-causing sound source. That is, the server 402 includes a search control device 404 having substantially the same function as the search control device 94b in the above-described first embodiment. It is noted that the search control device 404 corresponds to "control device" recited in the appended claims.

In the present third embodiment, a sound-source search device 406 (hereinafter referred to as "search device 406") has a function of measuring the noise during running of the vehicle 10 and a function of measuring the sound measuring position of the search device 406, but does not have a function of extracting the sound-source candidates, a function of setting the sound measuring position dependent on each of the sound-source candidates, a function of determining whether the position of the search device 406 is correct or not, and a function of presuming the noise-causing sound source. The result of measurement made by the search device 406, i.e., the sound data, is transmitted to the server 402 through the wireless communication. It is noted that a communication device such as a transceiver is not shown in FIG. 16.

Further, between the server 402 and the vehicle control apparatus 100 that is provided in the vehicle 10, various information can be transmitted and received through the wireless communication. For example, the running speed V and the accelerator opening degree θacc representing the driving state of the vehicle 10 in process of the measurement of the noise during running of the vehicle 10, are transmitted to the server 402.

Further, in the present third embodiment, the various information such as the extracted sound-source candidates, the first and second measuring positions dependent on each of the extracted sound-source candidates and the deviation amount D (correction amount F) of the installed position of the search device 406 from the sound measuring position are indicated in a display 406a that is provided in the search device 406. However, the various information may be indicated in a display 410 provided inside the vehicle cabin, or in a display 414 provided in a mobile device 412 that is carried by the inspector. It is noted that the display 406a provided in the search device 406 corresponds to "informing device" recited in the appended claims, and that, where the various information are indicated in the display 410 inside the vehicle cabin or in the display 414 of the mobile device 412, the display 410 or the display 414 corresponds to "informing device" recited in the appended claims.

As described above, in the sound-source search system 400 according to the third embodiment, the noise is measured by the search device 406, which is installed in accordance with the information indicated, for example, in the display 406a provided in the search device 406, owing to the control operations made by the search control device 404 provided in the server 402. Thus, in the third embodiment, too, the noise-causing sound source can be presumed with an increased accuracy without increasing the burden to the inspector. The specific process of searching the noise-causing sound source is basically the same as in the above-described first embodiment, and accordingly is not described.

Fourth Embodiment

Figure 17:
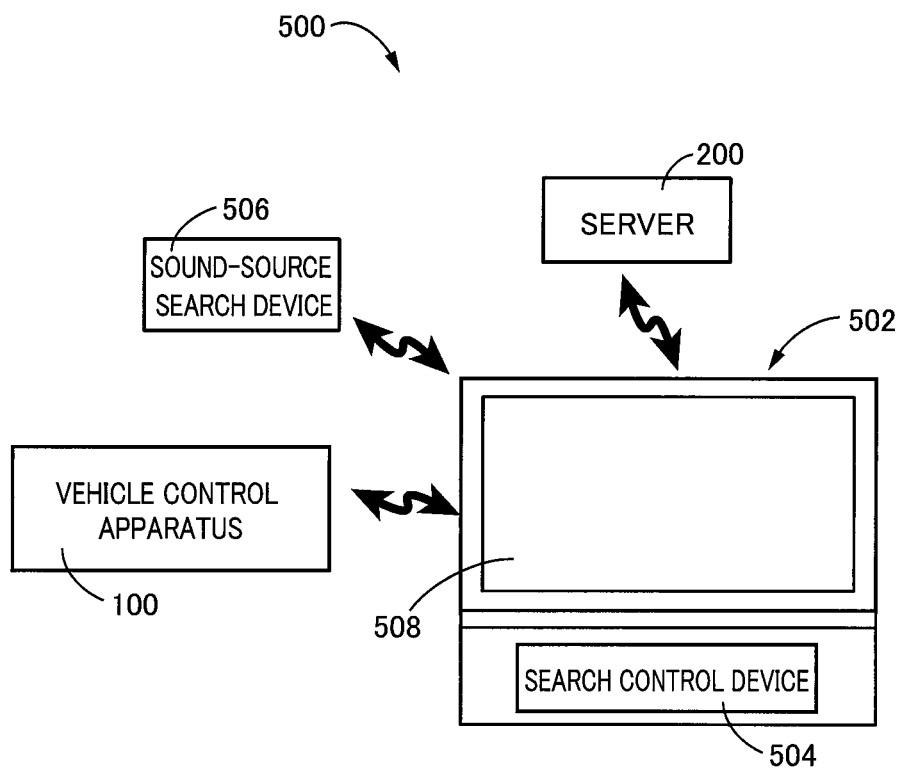
FIG. 17 is a view showing an overall construction of a sound-source search system according to still another embodiment of the present invention.

FIG. 17 is a view showing an overall construction of a sound-source search system 500 according to this fourth embodiment of the present invention. In the present fourth embodiment, a mobile device 502, which is to be carried by the inspector, has a function of searing the noise-causing sound source. That is, the mobile device 502 includes a search control device 504 having substantially the same function as the search control device 94b in the above-described first embodiment. It is noted that the search control device 504 corresponds to "control device" recited in the appended claims.

In the present fourth embodiment, a sound-source search device 506 (hereinafter referred to as "search device 506") has a function of measuring the noise during running of the vehicle 10 and a function of measuring the sound measuring position of the search device 506, but does not have a function of extracting the sound-source candidates, a function of setting the sound measuring position dependent on each of the sound-source candidates, a function of determining whether the position of the search device 506 is correct or not, and a function of presuming the noise-causing sound source. The result of measurement made by the search device 506, i.e., the sound data, is transmitted to the mobile device 502 through the wireless communication. It is noted that a communication device such as a transceiver is not shown in FIG. 17.

Further, between the server 200 and the mobile device 502, the information can be transmitted and received through the wireless communication. For example, when the sound-source candidate map of FIG. 6 or the related map of FIG. 7 is updated, the updated map is transmitted as needed from the server 200 to the mobile device 502. Further, when the noise-causing sound source is to be searched, the sound-source candidate map and the related map corresponding to the type and the drive system of the vehicle are transmitted from the server 200 so as to be referred to as need. Further, between the vehicle control apparatus 100 and the mobile device 502, the information can be transmitted and received through the wireless communication. For example, the running speed V and the accelerator opening degree θacc representing the driving state of the vehicle 10 in process of the measurement of the noise during running of the vehicle 10, are constantly transmitted to the mobile device 502.

Further, in the present fourth embodiment, the various information such as the extracted sound-source candidates, the first and second measuring positions dependent on each of the extracted sound-source candidates and the deviation amount D (correction amount F) of the installed position of the search device 506 from the sound measuring position are indicated in a display 508 that is provided in the mobile device 502. It is noted that the display 508 corresponds to "informing device" recited in the appended claims.

As described above, in the sound-source search system 500 according to the fourth embodiment, the noise is measured by the search device 506, which is installed in accordance with the information indicated in the display 508 provided in the mobile device 502, owing to the control operations made by the search control device 504 provided in the mobile device 502. Thus, in the fourth embodiment, too, the noise-causing sound source can be presumed with an increased accuracy without increasing the burden to the inspector. The specific process of searching the noise-causing sound source is basically the same as in the above-described first embodiment, and accordingly is not described.

While the preferred embodiments of this invention have been described in detail by reference to the drawings, it is to be understood that the invention may be otherwise embodied.

For example, in the above-described embodiments, the sound-source candidates are extracted depending on the vehicle running speed V (or value related to the running speed V) and the accelerator opening degree θacc (or value related to the accelerator opening degree θacc). However, in addition to the vehicle running speed V and the accelerator opening degree θacc, the gear position established in the step-variable transmission portion 20 or an overall gear ratio established in the power transmission apparatus 12 constituted by the continuously-variable transmission portion 18 and the step-variable transmission portion 20 may be taken into account when the sound-source candidates are to be extracted. Moreover, the sound-source candidates may be extracted depending on one of the vehicle running speed V (or value related to the running speed V) and the accelerator opening degree θacc (or value related to the accelerator opening degree θacc).

In the above-described embodiments, any one of the search devices 94, 306, 406, 506 is installed inside the vehicle cabin, for searching the sound source that causes the noise propagated inside the vehicle cabin. However, where the noise propagated outside the vehicle cabin is an issue to be solved, the search devices 94, 306, 406, 506 may be installed outside the vehicle cabin.

In the above-described embodiments, the noise is measured during running of the vehicle 10. However, the noise may be measured during stop of the vehicle 10. For example, the noise measurement is made when the noise is generated in an engine idling state during stop of the vehicle 10.

In the above-described embodiments, the measuring-position checking portion 110 is configured to calculate the deviation amount D from the appropriate sound measuring position, through the soundwave outputted from the search device 94. However, for example, an in-vehicle camera may be provided on an upper side of a rearview center mirror, so as to take an image an interior of the vehicle cabin, such that the measuring-position checking portion 110 is configured to calculate the deviation amount D by analyzing the image taken by the in-vehicle image.

In the above-described embodiments, the noise-causing sound source is presumed based on the result of the noise measurement made in the first and second measuring positions. However, for further increasing the accuracy of presuming the noise-causing sound source, the noise measurement may be made not only in the first and second measuring positions but also in a third measuring position in the form of a position C shown in FIG. 8, for example. The position C as the third measuring position is a position which is more distant from the position A as the first measuring position than the position B as the second measuring position, and in which the noise is not substantially detected. When the noise is not substantially detected by the search device 94 in a state in which the search device 94 is installed in the third measuring position, the possibility that the first candidate is the noise-causing sound source is further increased. Further, another measuring position such as a fourth measuring position maybe added to the first, second and third measuring positions. Moreover, for further reducing the burden to the inspector, it is possible to presume whether the possibility that the sound-source candidate is the noise-causing sound source is high or not, based on the result of measurement made only in the first measuring position.

In the above-described embodiments, the interior of the vehicle cabin is displayed in a two dimensional manner in the display such as the display 94c of the search device 94. However, the interior of the vehicle cabin may be displayed in a three dimensional manner. In connection with this, the deviation amount D (correction amount F) from each of the first and second measuring positions may be calculated not only in the X-axis direction and Y-axis direction shown in FIG. 8 but also in a height direction of the vehicle 10.

In the above-described first embodiment, the various information such as the extracted sound-source candidates, the first and second measuring positions dependent on each of the extracted sound-source candidates and the deviation amount D (correction amount F) of the installed position of the search device 94 from the sound measuring position are indicated in the display 94s of the search device 94. However, the information do not have to be informed necessarily through the display but may be informed through a voice or sound, example. That is, means for informing the inspector of the various information required for searching the noise may be modified as needed.

In the above-described first embodiment, the search control device 94b executes all the control steps such as extraction of the sound-source candidates, setting of the first and second measuring positions dependent on each of the sound-source candidates and presumption of the noise-causing sound source, which are to be executed when the noise-causing sound source are searched. However, at least one of the control steps may be executed in the server 200 or in the vehicle control apparatus 100. For example, the extraction of the sound-source candidates may be executed in the server 200. Similarly, in each of the second through fourth embodiments, too, at least one of the control steps, which are executed by a corresponding one of the search control devices 304, 404, 504, may be executed by another control device.

In the above-described first embodiment, the sound-source search system 8 includes the server 200. However, the sound-source search system 8 does not have to include the server 200, in an arrangement in which the sound-source candidate map of FIG. 6 and the related map of FIG. 7 are pre-stored in the search control device 94b so that no information is transmitted and received between the search control device 94b and the server 200. Similarly, each of the sound-source search system 300, 500 in the second and fourth embodiments does not necessarily have to include the server 200, either.

In the above-described first embodiment, the various information are indicated in the display 94c of the search device 94, so as to be informed to the inspector. However, the information may be indicated in a display provided in the vehicle 10 or a display provided in a mobile device carried by the inspector. Further, in the above-described fourth embodiment, the various information are indicated in the display 508 provided in the mobile device 502, so as to be informed to the inspector. However, the information may be indicated in a display provided in the search device 506 or a display provided in the vehicle 10.

In the above-described embodiments, the vehicle 10 is provided with the power transmission apparatus 12 including the continuously-variable transmission portion 18 and the step-variable transmission portion 20 that are connected to each other in series. However, the provision of the power transmission apparatus 12 including the continuously-variable transmission portion 18 and the step-variable transmission portion 20 is not essential. For example, in the vehicle to which the present invention is applied, an engine and a rotating machine may be connected to each other without provision of the differential mechanism 32 or the like therebetween, and a step-variable transmission may be provided between drive wheels and the drive power sources (i.e., the engine and the rotating machine), wherein the step-variable transmission may be replaced with a belt-type continuously-variable transmission.

In the above-described embodiments, the vehicle 10 is a hybrid electric vehicle having the drive power sources in the form of the engine 14 and the second rotating machine MG2. However, the vehicle to which the present invention is applied does not have to be necessarily a hybrid electric vehicle, but may be an engine vehicle or electric vehicle having only one drive power source in the form of the engine 14 or rotating machine, for example. That is, the present invention is not limited to vehicles having certain types of drive power sources and certain types of drive systems, for example.

In the above-described embodiments, the vehicle 10 is provided with a function of the automatic drive control. However, the provision of the automatic drive function is not essential, and the present invention is applicable also to a vehicle that is to be driven only manually.

It is to be understood that the embodiments described above are given for illustrative purpose only, and that the present invention may be embodied with various modifications and improvements which may occur to those skilled in the art.

NOMENCLATURE OF ELEMENTS

8; 300; 400; 500: sound-source search system
94; 306; 406; 506: sound-source search device
94b; 304; 404; 504: search control device (control device)
94c; 306a, 312; 406a, 414; 508: display (informing device)
308; 410: display (informing device)

What is claimed is:

1. A sound-source search system for searching a sound source that causes a noise generated from a vehicle and propagated inside or outside a cabin of the vehicle,
the sound-source search system comprising:
a microphone configured to acquire sound data by collecting and measuring a sound;
a display configured to determine and notify a sound measuring position in which the microphone is to be installed for collecting and measuring the sound; and
a controller configured to acquire a driving information of a driving state of the vehicle upon generation of the noise,
wherein the controller is further configured to:
extract a sound-source candidate that is a candidate of the sound source causing the noise, based on the acquired driving information,
store a predetermined relationship between the extracted sound-source candidate and the sound measuring position,
set the sound measuring position based on the extracted sound-source candidate and the predetermined relationship, such that the sound measuring position is changed depending on the extracted sound-source candidate,
cause the display to notify the sound measuring position which is set based on the extracted sound-source candidate and the predetermined relationship, and
determine whether the sound-source candidate is the sound source or not, based on the sound data acquired when the sound is collected and measured by the microphone in a state in which the microphone is installed in the sound measuring position,
wherein the sound source is a device or a part of the vehicle.

2. The sound-source search system according to claim 1,
wherein the controller is further configured, when the microphone is installed, to acquire an amount of deviation of an installed position in which the microphone is installed, from the sound measuring position, and
wherein the controller is further configured, when the amount of the deviation exceeds a threshold value, to cause the display to determine and notify the amount of the deviation as a correction amount by which the installed position of the microphone is to be corrected.

3. The sound-source search system according to claim 1,
wherein the controller is further configured to set, as the sound measuring position, a first measuring position and a second measuring position, and
wherein the controller is further configured to determine whether the sound-source candidate is the sound source or not, based on (i) the sound data acquired when the sound is collected and measured by the microphone in a first state in which the microphone is installed in the first measuring position, and (ii) the sound data acquired when the sound is collected and measured by the microphone in a second state in which the microphone is installed in the second measuring position.

4. A sound-source search method of searching a sound source that causes a noise generated from a vehicle and propagated inside or outside a cabin of the vehicle, by using a microphone configured to acquire sound data by collecting and measuring the noise, the sound-source search method comprising:
causing a controller to acquire a driving information of a driving state of the vehicle upon generation of the noise;
causing the controller to extract a sound-source candidate that is a candidate of the sound source, based on the acquired driving information;
causing the controller to store a predetermined relationship between the extracted sound-source candidate and a sound measuring position in which the microphone is to be installed for collecting and measuring the sound;
causing the controller to set the sound measuring position based on the extracted sound-source candidate and the predetermined relationship, such that the sound measuring position is changed depending on the extracted sound-source candidate;
causing a display to notify the sound measuring position which is set based on the extracted sound-source candidate and the predetermined relationship;
causing the microphone to acquire the sound data, and
causing the controller to determine whether the sound-source candidate is the sound source or not, based on the sound data acquired when the sound is collected and measured by the microphone in a state in which the microphone is installed in the sound measuring position,
wherein the sound source is a device or a part of the vehicle.

5. The sound-source search system according to claim 1, wherein the microphone is to be temporarily installed for collecting and measuring the sound.

6. The sound-source search method according to claim 4, further comprising removing the microphone after acquiring the sound data.

7. The sound-source search system according to claim 1, wherein the acquired driving information includes a vehicle running speed and an accelerator opening degree.

8. The sound-source search method according to claim 4, wherein the acquired driving information includes a vehicle running speed and an accelerator opening degree.

9. The sound-source search system according to claim 1,
wherein the extracted sound-source candidate is one of a plurality of sound-source candidates,
wherein the sound measuring position is a first sound measuring position, and
wherein the controller is configured to:
extract the sound-source candidate collected by the microphone in an initial position, and
cause the display to determine and notify a second sound measuring position which is set based on a predetermined relationship between the extracted sound-source candidate and the second sound measuring position when there is a possibility that the extracted sound-source candidate is the sound source that causes the noise generated from the vehicle.

10. The sound-source search method according to claim 4,
wherein the extracted sound-source candidate is one of a plurality of sound-source candidates,
wherein the sound measuring position is a first sound measuring position,
wherein the controller extracts the sound-source candidate collected by the microphone in an initial position, and
wherein after causing the display to determine and notify the first sound measuring position, causing the display to determine and notify a second sound measuring position in which the microphone is to be installed for collecting and measuring the noise, wherein the second sound measuring position is set based on a predetermined relationship between the extracted sound-source candidate and the second sound measuring position when there is a possibility that the extracted sound-source candidate is the sound source that causes the noise generated from the vehicle.

* * * * *